United States Patent [19]

Chandler et al.

[11] Patent Number: 4,998,010

[45] Date of Patent: Mar. 5, 1991

[54] POLYGONAL INFORMATION ENCODING ARTICLE, PROCESS AND SYSTEM

[75] Inventors: Donald G. Chandler; Eric P. Batterman, both of Princeton; Govind Shah, Princeton Junction, all of N.J.

[73] Assignee: United Parcel Service of America, Inc., Greenwich, Conn.

[21] Appl. No.: 438,571

[22] Filed: Nov. 16, 1989

Related U.S. Application Data

[63] Continuation of Ser. No. 330,111, Mar. 31, 1989, Pat. No. 4,896,029, which is a continuation-in-part of Ser. No. 178,600, Apr. 19, 1988, Pat. No. 4,874,936.

[51] Int. Cl.⁵ ............................................. G06K 19/06
[52] U.S. Cl. ..................................... 235/494; 235/487; 235/464
[58] Field of Search ............... 235/454, 456, 463, 469, 235/487, 464; 250/219

[56] References Cited

U.S. PATENT DOCUMENTS

| | | | |
|---|---|---|---|
| 3,513,320 | 5/1970 | Weldon | 250/219 |
| 3,553,438 | 1/1971 | Blitz . | |
| 3,603,728 | 9/1971 | Arimura . | |
| 3,660,641 | 5/1972 | Levasseur | 235/494 |
| 3,693,154 | 9/1972 | Kubo . | |
| 3,801,775 | 4/1974 | Acker . | |
| 3,916,160 | 10/1975 | Russo . | |
| 3,959,631 | 5/1976 | Otten . | |
| 3,971,917 | 7/1976 | Maddox . | |
| 3,985,293 | 10/1976 | Riffee . | |
| 4,286,146 | 8/1981 | Uno | 235/456 |
| 4,439,672 | 3/1984 | Salaman | 235/463 |
| 4,443,694 | 4/1984 | Sanford | 235/465 |
| 4,488,679 | 12/1984 | Bockholt | 235/469 |
| 4,634,850 | 1/1987 | Pierce | 235/487 |

FOREIGN PATENT DOCUMENTS 1216539 12/1970 United Kingdom .

OTHER PUBLICATIONS

Vericodes: The Two Dimensional High Data Density Machine Readable Symbology for Automatic Identification of Products and Documents (The publication date of this report is unknown).

Primary Examiner—Harold I. Pitts
Attorney, Agent, or Firm—James A. Drobile; Raymond G. Arner

[57] ABSTRACT

The article of the invention is an optically readable label for storing encoded information, said label comprising a data array of a multiplicity of information-encoded polygons arranged in a predetermined geometric pattern, and said polygons having at least two different optical properties.

a process for encoding information in an optically-readable data array comprised of information-encoded polygons by assigning optical properties to individual polygons in a predetermined pattern, ordering the polygons in a predetermined sequence, and printing the polygons with at least two optical properties.

A process for retrieving information by optically scanning a data array of information-encoded polygons, preferably hexagons, creating an optical replica of the digital bit stream representative of the optical properties of the information-encoded polygons, decoding that optical replica and retrieving the decoded bit stream.

A system for performing the foregoing encoding and decoding processes.

19 Claims, 12 Drawing Sheets

Fig. 5

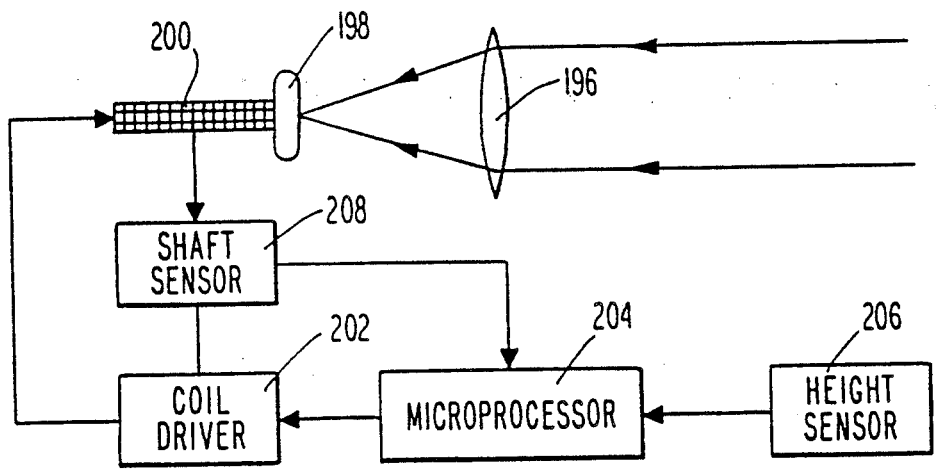

Fig. 6

LABEL READING PROCESS

1. ILLUMINATION OF THE LABEL
2. OPTICAL SENSING OF THE REFLECTED IMAGE
3. PROCESSING THE REFLECTED IMAGE
   a. LOCATING THE TARGET (OPTIONAL)
   b. NORMALIZATION OF THE SENSED IMAGE (OPTIONAL)
   c. RESCALING THE IMAGE (OPTIONAL)
   d. TWO-DIMENSIONAL CLOCK RECOVERY
      i. EDGE ENHANCEMENT OPERATION
      ii. WINDOWING (OPTIONAL)
      iii. TWO-DIMENSIONAL FAST FOURIER TRANSFORMATION
      iv. FILTERING THE IMAGE
      v. INVERSE FAST FOURIER TRANSFORMATION
   e. MAJOR AXIS DETERMINATION (OPTIONAL)
   f. SEARCHING
      i. INITIALIZATION
      ii. MAIN SEARCH LOOP
   g. HISTOGRAM GENERATION (OPTIONAL)
      COARSE GRID DETERMINATION AND FINAL ORIENTATION (OPTIONAL)
4. DECODING
5. OUTPUT

Fig. 7

POLYGONAL INFORMATION ENCODING ARTICLE, PROCESS AND SYSTEM

This is a continuation of application Ser. No. 07/330,111, filed Mar. 31, 1989 Now U.S. Pat. No. 4,896,029, which is a continuation-in-part application of U.S. Ser. No. 07/178,600, filed 4/8/88 (now U.S. Pat. No. 4,874,936).

MICROFICHE APPENDIX

A Microfiche Appendix is included in the present application comprising one microfiche and a total of one test target frame and frames of computer program listings.

FIELD OF THE INVENTION

This invention relates to an improved optically readable label and a reading system therefor, and, in particular, to an improved optically readable label, attached to or printed on a substrate, for storing information within a two-dimensional data array, comprising a multiplicity of polygons arranged in a predetermined geometric pattern, and said polygons having at least two different optical properties.

STATEMENT OF RELATED ART

Merchandise, various component parts, letters, packages, containers and a whole gamut of related items being shipped or transported, frequently are required to be identified with information as to origin, flight number, destination, name, price, part number and numerous other kinds of information. In other applications, reading encoded information printed on labels affixed to such items permits automation of sales figures and inventory or the operation of electronic cash registers. Other applications for such encoded labels include the automated routing and sorting of mail, parcels, baggage, and the like, and the placing of labels bearing manufacturing instructions on raw materials or component parts in a manufacturing process. Labels for these types of articles are conventionally marked with bar codes, one of which is the Universal Product Code. Numerous other bar code systems are also known in the art.

Commercially-available bar code systems typically lack sufficient data density to accommodate the present and increasing need to encode more and more information on labels of increasingly smaller size. Attempts to reduce the overall size and spacing of bars in various bar code systems to increase data density have not solved the problem; optical scanners having sufficient resolution to detect bar codes comprising contrasting bars spaced five mils or less apart are generally not economically feasible to manufacture because of the close tolerances inherent in the label printing process and the sophisticated optical apparatus required to resolve bit-encoded bars of these dimensions. Alternatively, to accommodate increased amounts of data, very large bar code labels must be fabricated, with the result that such labels are not compact enough to fit on small articles. Another important factor is the cost of the label medium, such as paper. A small label has a smaller paper cost than a large label; this cost is an important factor in large volume operations.

Alternatives to bar codes include: circular formats employing radially disposed wedge-shaped coded elements, such as in U.S. Pat. No. 3,553,438, or concentric black and white bit-encoded rings, such as in U.S. Pat. Nos. 3,971,917 and 3,916,160; grids of rows and columns of data-encoded squares or rectangles, such as in U.S. Pat. No. 4,286,146; microscopic spots disposed in cells forming a regularly spaced grid, as in U.S. Pat. No. 4,634,850; and densely packed multicolored data fields of dots or elements, such as described in U.S. Pat. No. 4,488,679. Some of the coding systems described in the foregoing examples and other coding systems known in the art primarily suffer from deficiencies in data density, such as in the case of encoded circular patterns and grids of rectangular or square boxes. Alternatively, in the case of the grids comprised of microscopic spots or multicolored elements referred to above, such systems require special orientation and transport means, thus limiting their utility to highly controlled reading environments.

Due to the size and speed of modern conveyor systems, (utilizing conveyor belt widths of 3 to 4 feet, for example) and having belt speeds approaching 100 inches per second or more, carrying packages of varying heights on which information encoded labels are affixed, and the need to utilize a small, inexpensive, compact label of about one square inch, great strains are placed on the optical and decoding systems required to locate and read the data encoded labels on these rapidly moving packages and the like. There are difficulties in the optical scanner simply acquiring the label image. Furthermore, once acquired or identified, the label image must be accurately decoded before the next operation on the package in the conveyor system takes place, often in a fraction of a second. These problems have led to the need for providing a simple, rapid and low-cost means of signaling the presence of a data-encoded label within the field of view of an optical scanner mounted in a manner to permit scanning the entire conveyor belt. This feature desirably is coupled with a high density data array, described in more detail below.

Data arrays containing acquisition targets are known in the art; for example, concentric geometric figures, including rings, squares, triangles, hexagons and numerous variations thereof, such as described in U.S. Pat. Nos. 3,513,320 and 3,603,728. U.S. Pat. Nos. 3,693,154 and 3,801,775 also describe the use of symbols comprising concentric circles as identification and position indicators, which symbols are affixed to articles to be optically scanned. However, these systems employ two separate symbols to determine the identification of the data field and its position, thereby increasing the complexity of the logic circuitry required to detect the symbols, as well as reducing the data-carrying capacity of the associated data field. Also, when two symbols are used, damage to one causes problems in locating the position of the data field and the attendant ability to recover information from the data field. In the latter system, separate position and orientation markings are utilized at opposite ends of data tracks having data-encoded linear markings of only limited data carrying capability.

The foregoing systems are generally scanned with an optical sensor capable of generating a video signal output corresponding to the change in intensity of light reflected off the data array and position and orientation symbols. The video output of such systems, after it is digitized, has a particular bit pattern which can be matched to a predetermined bit sequence. These systems, however, suffer the drawback of requiring two separate symbols for first ascertaining the image and secondly determining its orientation. Also, the process of having to match the digitized signal output of the optical sensor with a predetermined bit sequence representing both the position and orientation symbols, is more likely to produce erroneous readings that the process and system of this invention, because the prior art label acquisition systems provide an inflexible characterization of the acquisition target signal level.

U.S. Pat. No. 3,553,438 discloses a circular data array having a centrally-located acquisition target comprising a series of concentric circles. The acquisition target provides a means of acquiring the circular label by the optical sensor and determining its geometric center and thereby the geometric center of the circular data array. This is done through logic circuitry operating to recognize the pulse pattern representative of the bulls-eye configuration of the acquisition target. However, as for bar codes, the data array has only a limited data capacity and the system requires a second circular scanning process. Use of both a linear and circular scan for a system of such limited data capacity creates undesirable complexity in the system for a slight gain in data capacity over conventional bar codes.

To increase the data carrying capacity of data arrays, codes employing multiple high density colored dots have been developed, as described in U.S. Pat. No. 4,488,679. Systems of the type described in U.S. Pat. No. 4,488,679, however, require the use of hand-held optical scanners, which are totally incapable of recording and decoding rapidly moving data arrays on a package being transported on a high-speed conveyor belt. Analogously, high density coding systems employing microscopic data-encoded spots, as described in U.S. Pat. No. 4,634,850, require special transport means, thereby ensuring that the data array is moved in a specific direction, rather than simply at a random orientation, as might be found with a package being transported on a conveyor belt or the like. Thus, the coded label must be read track by track, utilizing a linear scanner coupled with label transport means to properly decode the information encoded on the label. Also, in this patent, the position of the card in relation to the sensor must be very carefully controlled to be readable.

Multiple colors have also been utilized in the art of producing bar code systems so as to overcome the optical problems of scanning very minute bars. A bar code utilizing more than two optical properties to encode data in a data array, by for instance, use of alternating black, gray and white bars, is described in U.S. Pat. No. 4,443,694. However, systems of the type described, although an improvement over earlier bar code systems, nevertheless fail to achieve the compactness and data density of the invention described herein.

OBJECTS OF THE INVENTION

In view of the foregoing drawbacks of prior optical coding systems, it is a principal object of this invention to provide new and improved compact, high-information-density, optically-readable labels.

Another object of the invention is to provide new and improved optically readable labels which may be encoded with about 100 highly error-protected alphanumeric characters per square inch of label area.

Still another object of this invention is to provide new and improved compact high-information-density, optically-readable labels which may be read by an optical sensor when the label is affixed to a package or other like article being transported on a high speed conveyor system, without regard to the orientation of the package thereon or the variability of the heights of said packages upon which the optically-readable label is affixed.

A concomitant object of this invention is to provide an optically-readable label and decoding system combination, so that the label is capable of being reliably decoded even if tilted, curled, warped, partially obliterated or partially torn.

An additional object of this invention is to provide methods for determining the location of a label passing under an optical sensor at high speed and decoding said label with a high degree of data integrity.

It is a further object of this invention to provide improved methods of encoding compact, high-information-density, improved, optically-readable labels by dividing the information to be encoded into higher and lower priority messages, to create a hierarchy of messages, which are separately error protected to ensure the integrity of the encoded information.

It is yet another object of this invention to provide improved methods and systems of encoding and decoding compact, high density, improved, optically-readable labels which include error correction capabilities, so as to restore misread or missing information and to do so with a preference to the high priority encoded message.

A further object of this invention is to produce inexpensive optically-readable labels by conventional printing means and decoding same, with relatively inexpensive logic circuitry.

Further objects and advantages of the invention will become apparent from the description of the invention which follows.

SUMMARY OF THE INVENTION

The present invention comprises an optically-readable label for storing data encoded in bit form, comprising a predetermined two-dimensional data array of a multiplicity of information-encoded polygons arranged contiguously, partially contiguously or noncontiguously in a predetermined two-dimensional pattern and having at least two different optical properties as well as methods and apparatus for encoding and decoding such optically-readable labels.

Optically readable labels of the invention may comprise predetermined two-dimensional geometric arrays of polygons where the geometric centers of such polygons lie at the vertices of the intersecting axes as more fully discussed below of a predetermined two-dimensional array and where the polygons have one of at least two different optical properties. The polygons of such optically readable labels may be regular or irregular polygons and the two-dimensional arrays of polygons on the optically readable labels may have two or more equally- or unequally-angularly spaced axes in the plane of the label.

Optically readable labels may be printed with configurations of polygons which are totally contiguous, partially contiguous or noncontiguous. The latter two configurations inherently define a multiplicity of interstitial spaces on the optically readable label between adjacent polygons. Such interstitial spaces may have the same or different optical properties as the two or more optical properties of the polygons. Two-dimensional arrays of contiguous polygons having five or more sides are usable as optically readable label configurations of the invention. Also, two-dimensional arrays of either regular or irregular, and either partially contiguous or noncontiguous, polygons having three or more sides, when prearranged on predetermined axes of such arrays, may be encoded and decoded in accordance with the processes of the invention.

In addition to the foregoing varieties of geometric polygonal cells, arrangements of such polygonal cells, and geometries of the optically readable labels formed by such arrangements of polygonal cells, the optically readable labels of the invention may optionally contain an acquisition target comprising a series of concentric rings to aid in the locating of the optically readable labels on the articles upon which they are affixed, particularly in dynamic label reading systems.

In a preferred embodiment of the invention, the data array comprises a generally square-shaped array of about one square inch, having contiguously-arranged hexagons forming rows and columns and a centrally-located acquisition target having a geometric center which defines the geometric center of the data array. The acquisition target may be any of a number of geometric shapes having optical properties capable of generating an easily recognizable video signal when scanned with an optical sensor across a linear scan line passing through the geometric center of the acquisition target. In a preferred embodiment, the acquisition target is a plurality of concentric rings of contrasting reflectivities, which will yield a periodic video signal when scanned linearly. By using analog filter means as part of the method of locating and decoding the data array, the signal generated by the optical sensor is compared directly with a predetermined frequency, thereby allowing rapid and precise matching of the frequencies and consequent determination of the location of the data array affixed to a substrate. The analog electrical signal output from the optical sensor representing the information-encoded label is then digitized and decoded. Utilizing an analog bandpass filtering step permits label acquisition to occur without the need for decoding the information-encoded label. By locating the center of the acquisition target a reference point on the data array may be determined. If the center of the acquisition target is located at the center of the label, a simultaneous determination of the center of the acquisition target and the data array may be accomplished. A central location of the acquisition target on the label is preferred, but not required, in the practice of the subject invention.

The optically-readable data array of the present invention is capable of encoding 100 or up to several hundred or more error protected alphanumeric characters in an area of about one square inch when hexagons are encoded utilizing three reflective properties, such as the colors black, white and gray. For a sensor with a given optical resolution, the system of the invention permits a much denser information packing capability than is possible with bar code systems. For example, if a high resolution optical sensor is used with the system of this invention, hundreds of alphanumeric characters may be encoded in a square inch. Alternatively, 100 characters per square inch may easily be detected with a relatively low resolution sensor with the system of this invention.

Optically-readable labels of the present invention may be produced with varying data densities by utilizing as few as two or more contrasting optical properties. Greater data densities and the inclusion of an acquisition target in the system of this invention require a scanning apparatus of increasing complexity and the addition of more elaborate decoding algorithms to read the encoded message, when compared with a bar code reading system.

In this invention, data encoding may be accomplished by encoding a plurality of bits from a binary bit stream into a cluster of contiguous hexagons, each hexagon having one of at least two optical properties, although the encoding could alternatively be done on a hexagon-by-hexagon basis. The digital bit stream may be generated by a computer, based upon data entered manually or otherwise converted into a binary bit stream, or may be provided as a prerecorded digital bit stream. The data to be encoded is bit-mapped in a predetermined sequence and within predetermined geographical areas of the data array to increase the number of transitions between hexagons having different optical properties.

In the preferred embodiment of the present invention, the messages to be encoded are divided into high and low priority messages, which are separately mapped in different geographic areas of the data array. The high priority message may optionally be duplicated in the low priority message area to reduce the possibility of losing the high priority message due to scanning errors caused by smudges, tears, folds and other types of damage to the data array. The high priority message is encoded in a central area of the data array, near the acquisition target contained in the preferred embodiment, in order to protect the message from damage which is more likely to occur to the peripheral areas of the data array. Error correction capabilities are desirably incorporated in the data array, utilizing the large information-carrying capacity of the present invention, to ensure a very high degree of data integrity upon decoding the message.

In practicing the invention, a pixel grid of sufficient density to print the label with hexagons of different optical properties is utilized, although alternative printing processes may be used without departing from the spirit of the invention. The pixel grid is bit-mapped so that, when the label is printed, the optical properties of each hexagon are predetermined, so that they may later be decoded to recover the data designated by the encoding of the individual hexagons. This type of printing process is well known in the art and standard printers and bit mapping techniques may be used to print hexagons having the optical properties required by this invention.

The present invention provides a new and improved process for retrieving the data encoded in the bit-mapped array of polygons, preferably hexagons, forming the data array. Encoded labels may be passed through a predetermined illuminated area and optically scanned by means of an electronically operated optical sensor or a hand-held scanner may be passed over the labels. The optical sensor produces an output which is an analog electrical signal corresponding to the intensity of the individual reflective property of an area of a label, as recorded by the individual pixels of the optical sensor. By means of an analog filter, the analog signal of the optical sensor is first compared to a predetermined frequency value corresponding to that of a predetermined acquisition target if it is present on the data array. Once a good match is found, the label is acquired and the center of the acquisition target is determined, thereby also determining a reference point on the data array. The analog signal is simultaneously digitized on a continuous basis by means of an analog-to-digital converter and stored in an image buffer. The stored digitized data representing the entire label is available for further processing in the decoding process.

By stored program logic circuits, the digital data is transformed into a map of the interfaces of hexagons having different optical properties. In a preferred embodiment of the invention, this is done by computing the standard deviation of the intensities of the reflective properties recorded by the optical sensor at each pixel and a predetermined group of pixels surrounding that first pixel. High standard deviations therefore correspond to transition areas at the interfaces of contrasting hexagons.

Further data transformations, involving filtering programs to determine orientation, direction and spacing of the hexagons, are performed on the digital data. The general steps of this process are:

(1) Filtering the non-linear transformed version of the digitized image.

(2) Determining the orientation of the label, preferably by locating the three axes of the image (as illustrated in FIG. 2) and determining which axis is parallel to two sides of the label.

(3) Finding the center of each hexagon and determining the gray level at each center.

(4) Transforming the gray levels to a bit stream.

(5) Optionally, applying error correction to that bit stream; and (6) Optionally, converting the bit stream to a predetermined set of characters.

It is to be noted that, although the process of this invention is described as applied to hexagons having two or more optical properties, the process, in particular, the steps for adjusting the optical image for label warp, tear and the like, may be applied to other types of labels and other polygonal cells.

Other objects and further scope of applicability of the present invention will become apparent from the Detailed Description of the Invention. It is to be understood, however, that the detailed description of preferred embodiments of the invention is given by way of illustration only and is not to be construed as a limitation on the scope of variations and modifications falling within the sprit of the invention, as made apparent to those skilled in the art.

BRIEF DESCRIPTION OF THE DRAWINGS

FIG. 5 is a cluster map showing a graphic representation of a data array comprising 33 rows and 30 columns, forming a grid of 11 rows and 10 columns of three cell × three cell cluster coding units of hexagons.

FIG. 6 is a schematic view of a camera adjusting system in accordance with the invention for adjusting the position of the optical light sensor in accordance with the height of package being sensed.

FIG. 7 is a detailed outline of the decoding process of this invention.

DETAILED DESCRIPTION OF THE INVENTION

The Label

Figure 1:
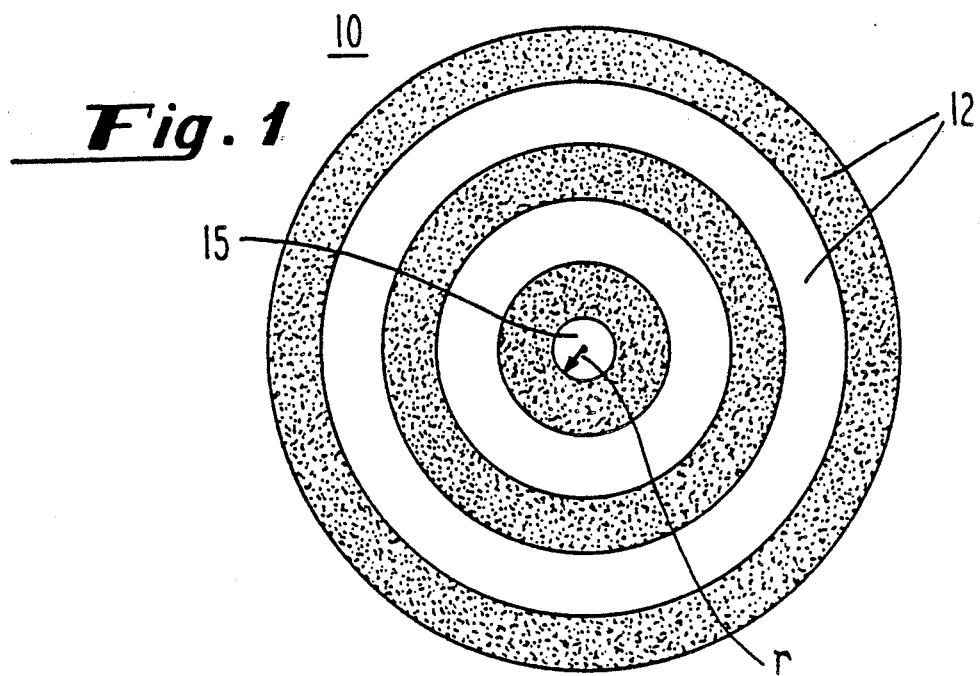
FIG. 1 is a plan view of an acquisition target of concentric rings in accordance with the present invention.

The ability to encode information by virtue of the contrasting colors of contiguous hexagons or "cells" arranged in a honeycomb pattern in a predetermined sequence and array permits the information stored on the label to be recovered by an electro-optical sensor. Polygonal cells, other than hexagons, that are arranged with the geometric centers of adjacent polygons lying at the vertices of a hexagonal or other predetermined array, may likewise be used to encode information on an optically readable label. Such polygonal cells, when arrayed with their respective centers at predetermined locations on a two-dimensional geometric array and when encoded in a predetermined sequence, through assigning different optical properties to a plurality of such polygonal cells, may be "read" by an electro-optical sensor and subsequently decoded in accordance with the process of the invention described below.

The polygonal cells of the invention are information encoding units formed by a closed broken line, which cells are arrayed in a predetermined two-dimensional pattern on an optically readable label. Label configurations employing a wide variety of polygonal shapes, and arrays of varying geometries, such as hexagonal, rectangular or square arrays, are usable in the practice of the invention. "Adjacent" polygonal cells may be totally contiguous, partially contiguous or noncontiguous on the optically readable label of the invention.

"Contiguous polygons" are polygons arranged with the geometric centers of adjacent polygons lying at the vertices of a predetermined two-dimensional array and with the borders of such polygons touching the borders of immediately adjacent polygons, leaving no interstitial spaces. "Partially contiguous polygons" are polygons arranged with the geometric centers of adjacent polygons lying at the vertices of a predetermined two-dimensional array and which polygons are separated somewhere along their respective borders from other surrounding polygons, thereby causing a multiplicity of interstitial spaces to be interspersed among said polygons on the optically readable label. "Noncontiguous polygons" are individual polygons arranged with the geometric centers of adjacent polygons lying at the vertices of a predetermined two-dimensional array, and having no contact between the borders of an individual polygon and polygons surrounding said polygon. Additionally, the polygonal cells and the predetermined two-dimensional grids or arrays upon which the centers of adjacent polygons are located may be irregular, having unequally-spaced axes, or regular, having equally-spaced axes, in configuration. Such two-dimensional array axes may be independent of the axes of symmetry, if any, of the polygonal cells.

As used in the label of this invention, hexagons present certain important advantages for encoding information on a label. Those advantages are:

(1) For a given optical resolution, hexagons can be more densely packed than other polygons. For example, at a given resolution, the corners of squares are more difficult to resolve, so that otherwise unnecessary optical resolution is required to "read" squares. Circles would be optimal for optical resolution, but the space between adjacent circles would be wasted and would complicate the processing and printing of the label image, because of the need to assign an optical property to the spaces. Hexagons permit optimum packing of information, compared with circles or other polygons including, octagons, squares, triangles and the like. Squares and triangles are problems because of the sharp corners they have. Circles and octagons are problems because of the wasted space between adjacent circles or octagons.

(2) A grid of contiguous hexagons has three axes. By using a label of a square or rectangular shape the major axis of the hexagon can be located by its predetermined relation to a side of the label. This location of the major axis of a hexagon grid facilitates the reading of the data encoded in the hexagon by its relation to that major axis.

As used herein, "label" includes a discrete unit, with a suitable adhesive backing, to be attached to a package or product, and the exterior surface of a container or other object on which optically-readable information is imprinted in accordance with this invention.

As used herein, "optically-readable data array" or "data array" means a pattern of contiguous hexagons or other polygonal cells having two or more optical properties to encode, in retrievable form, a body of data by virtue of the respective optical properties of and spatial relationship of the hexagons or other polygonal cells to each other. The hexagons or polygons imprinted to contain this recoverable information are referred to herein as "information-encoded" hexagons or polygons, because of the manner in which the label encodes information.

The pattern of contiguous hexagons with the maximum number of hexagon-to-hexagon interfaces for optimal reading and maximum information storage density is referred to as a "honeycomb pattern."

The contrasting reflective properties utilized to print the individual hexagons or cells of the data array can be varied greatly within the spirit of this invention. As used herein, "printing" means depositing materials having predetermined optical properties on a substrate, or changing the optical properties, as when "thermal" printing is used. "Printing" also includes the omission to deposit a material having a predetermined optical property on a portion of the substrate, where the substrate itself has a distinct optical property. For example, in printing hexagonal cells in black and white, if the substrate is white, then only black cells must actually be printed. Thus, as used herein, the white hexagonal cells are also within the definition of the term "print" or "printed."

As used herein, "optical properties" means light absorption, reflection and/or refraction properties of cells printed in different media. Where cells are printed in black (high density black ink), gray (half tones of black) and white (no printing on a white substrate), as is the case in the preferred embodiment of the invention, the invention is said to have three optical properties.

As used herein, and with reference to FIG. 1, "plurality of concentric rings" or "concentric rings" 10 means two or more concentric rings 12, one of which is the interior area of a circular zone 15 defined by the smallest radius "r" of the rings.

Figure 2:
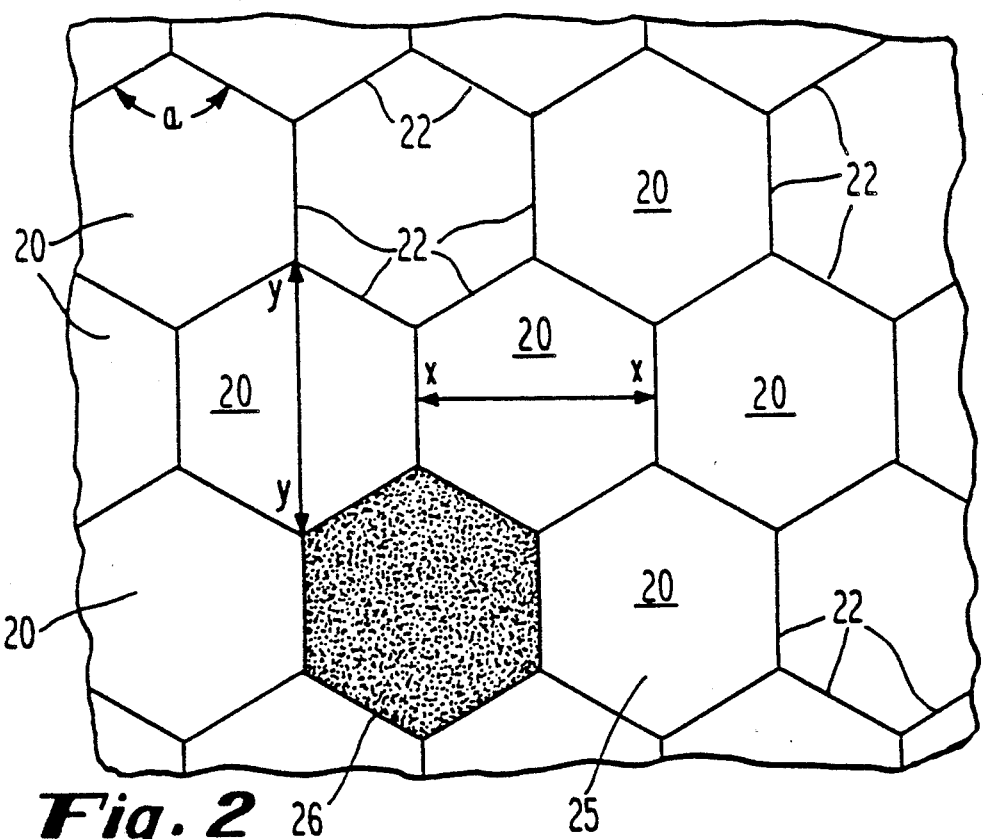
FIG. 2 is a fragmented plan view of an optically-readable label having contiguously-arranged hexagons for encoding data in accordance with the present invention.

FIG. 2 illustrates a portion of an electro-optically scannable label in accordance with the principles of this invention. As seen in FIG. 2, the label comprises a multiplicity of adjacent printed hexagonally-shaped cells, formed in a honeycomb pattern. Each of the individual hexagons is designated by numeral 20, and comprises 6 equal sides 22. The interior angles "a" of the hexagon are also equal, each of 120 degrees. In the illustrated embodiment, the hexagon has a long vertical axis y—y and a horizontal axis x—x. The x—x dimension of the hexagon 20 is somewhat smaller than the y—y dimension of the hexagon 20 due to the geometry of a regular hexagon.

Figure 3:
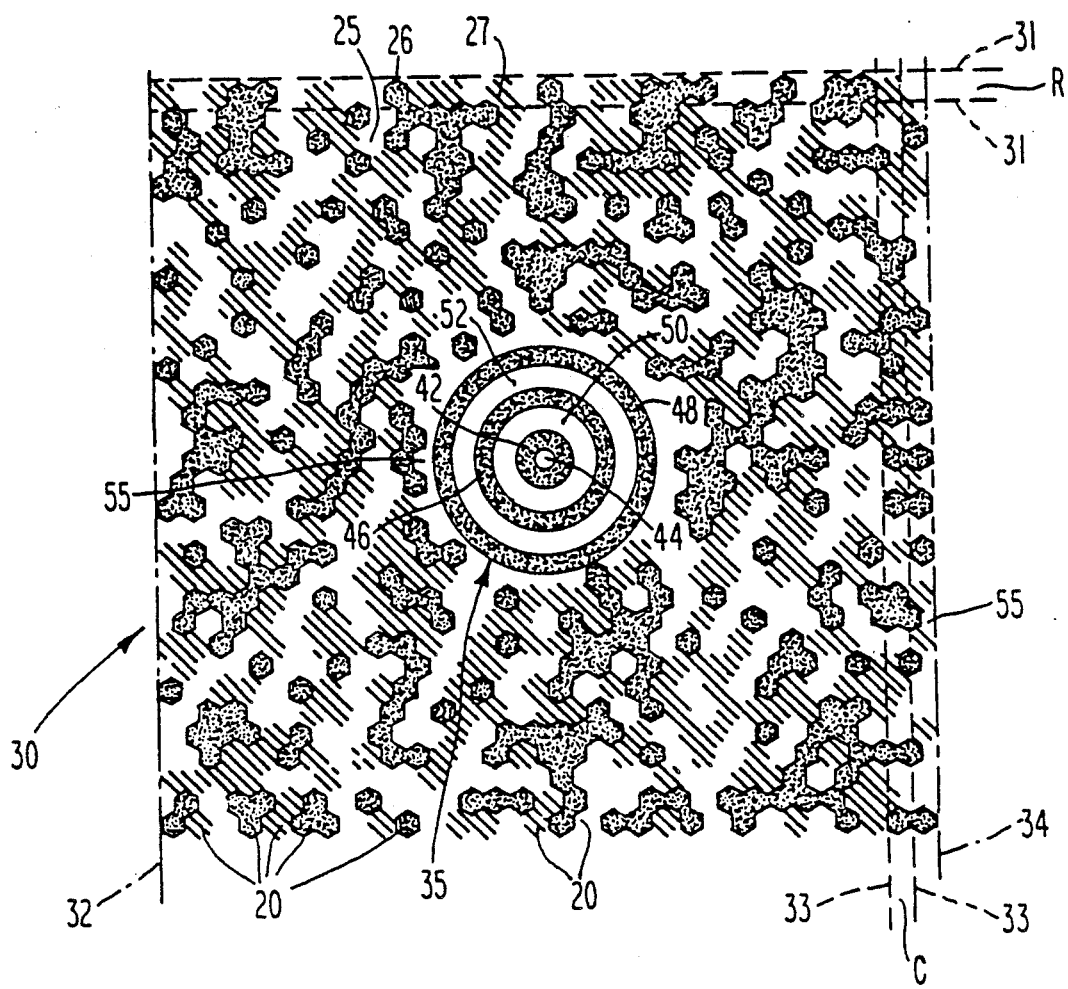
FIG. 3 is a plan view of a complete optically-readable label having contiguously-arranged hexagons of three optical properties for encoding binary data and including an acquisition target, in accordance with this invention.

In a preferred embodiment of the invention, as shown in FIG. 3, utilizing a label 30 having dimensions of approximately 1" by 1", there will be approximately 888 hexagons or cells 20 (taking into account the fact that, in the preferred embodiment, the center of the label is occupied by an acquisition target 35 comprised of a plurality of concentric rings). These contiguous hexagons 20 naturally form horizontal rows "R", defined by imaginary lines 31, and vertical columns "C", defined by imaginary lines 33. In this example a one inch by one inch label has a total of 33 horizontal rows "R" and 30 vertical columns "C" of hexagons 20. Each individual hexagon has a "diameter" of about 0.8 mm. There are more rows "R" than columns "C" in a square perimeter bounding a honeycomb pattern of hexagons, due to the geometric packing of the contiguous hexagons.

Utilizing the hexagons illustrated in FIG. 2, it will be seen that the hexagons are aligned in staggered and overlapping vertical columns, with alternate vertically spaced hexagons having co-linear y—y axes. The y—y axes of spaced hexagons 20 are in alignment with an exterior vertical side 22 of an intermediate, displaced hexagon. The y—y axes of hexagons 20 are parallel to the two vertical borders 32 and 34 of the label, as depicted in FIG. 3. Horizontal rows "R" are measured through the x—x axes at the mid-point of the hexagon 20.

As more fully described below, the hexagons 20 are formed by a printing process which will print the hexagons 20 in two or more optical properties, for example, contrasting colors. Those colors may be white 25, black 26 and also, optionally but preferably, gray 27 as illustrated in FIG. 3, although other contrasting colors may be utilized. It is possible to use only two contrasting colors, such as white 25, and black 26 as seen in FIG. 2. In the preferred embodiment of the invention, three contrasting colors are utilized, white 25, and black 26, and gray 27, illustrated in FIG. 3. The particular shades of white, black, and gray are selected to achieve optimum contrast for ease of identification by an electro-optical sensor. The gray level is selected so that its optical properties fall approximately equally between the optical properties of the white and black being used in creating the label.

The label 30 of FIG. 3 may be formed by using a discrete label, having, in a preferred embodiment, a one square inch area, or, if an acceptable color background is utilized (preferably white), the label may be printed directly on a package surface, without requiring a discrete label. Because of the importance of having a controlled optical property background for one of the contrasting colors, it is preferable to use a discrete label, because the color of the label background is more easily controlled.

The alignment of the hexagons printed on the label in relation to the sides of the label is important for subsequently determining the major axis of the label as described below. The label is printed so that the y—y axes of the hexagons forming the honeycomb will be parallel to the vertical sides of the label, 32 and 34, as shown in FIG. 3.

In "reading" the hexagonal array, in order to decode the information contained in the individual hexagons, it is important to have a sharp color contrast between adjacent hexagons. For reasons described below, the fewer optical properties utilized to encode the hexagons, the simpler may be the scanning equipment and software necessary to decode the hexagons. However, fewer optical properties also decrease the data density of the label. In a compromise between the amount of decoded information capable of being stored on the label and the cost of scanning multi-optical property labels, it has been found desirable to print the encoded hexagons with three optical properties, namely the colors black, gray and white. If the substrate or label has a good white background, then white hexagons can be created by the absence of ink, and only black and gray hexagons actually need to be printed.

In the preferred embodiment of the invention, the gray hexagonal cells are created by printing the cells with black ink, but only every fifth pixel of the pixel grid of a dot matrix printer is so printed in the illustrative example described herein. This is done by the use of a half-toning algorithm, in a manner which is well known in the art. This allows a printer to print a predetermined proportion of the pixels to define a given gray hexagon, whereas a black hexagon requires printing every pixel defining that hexagon. The specific half-toning algorithm used to print labels of the preferred embodiment is contained in the source code listing entitled "LABEL" in the Microfiche Appendix, page 29, linens 39 to 48.

The black hexagonal cells can be formed by printing with a standard black ink. As described below, the scanning analysis software of the decoding process makes gross determinations among black, gray and white reflectivities, so that precise color definition is not necessary. On the other hand, if colors other than black, gray and white are used, or if various shades of gray are used, to create four or five color data arrays, the contrast of ink shades must be much more carefully controlled to ensure measurable optical property differences among the various colors. It will be appreciated that the use of black ink is the simplest and easiest approach to creating a three optical property honeycomb array of hexagonal cells, and is the preferred embodiment of the invention.

Because of the square shape of the label in the preferred embodiment and the nature of the hexagonal cells, the edges of the honeycomb will contain incomplete hexagons 56; as seen in FIG. 3 these incomplete hexagons are not used to convey any useful information.

In the preferred embodiment of the invention, the label also contains an acquisition target. The acquisition target 35, seen in FIG. 3, comprises a plurality of concentric rings of contrasting colors (shown as black and white). The black rings are respectively designated 42, 46 and 48, and the white rings are respectively designated 44, 50 and 52. The target is preferably located in the geometric center of the label, to make it less susceptible to being damaged or destroyed, in whole or in part, if the periphery of the label is torn, soiled or damaged. Also, the size of the image buffer (described below), needed to store the data from the label before the label target is identified, is minimized when the acquisition target is in the label center.

The number of concentric rings used in the acquisition target may be varied, but the six concentric rings 42, 44, 46, 48, 50 and 52 and their resulting interfaces as they vary from white to black to white, etc., have been found to be convenient and desirable.

A pattern correlating technique is used to match a computed pattern of what the concentric rings are expected to be with the pattern being read. When the match occurs the acquisition target has been located as more fully described below. The specific filter created and utilized in connection with the preferred embodiment of the invention may be found in the Microfiche Appendix, page 41, lines 51 to 52 page 42, lines 1 to 8 and page 40, lines 19 to 41 under the file name "FIND.C."

The acquisition target may be of any overall diameter smaller than the data array, to provide an area which may be 25%, and is preferably about 7%, of the area of the data array. Preferably the acquisition target is sized as small as possible since the area it occupies on the label cannot carry encoded information. In the preferred embodiment the diameters of the imprinted rings are selected so that the outside boundary of the external ring 52 is about 7.45 millimeters. Thus, in FIG. 3 the area of the acquisition target 35 occupies about 7% of the surface area of the one square inch label 30. In this way, a satisfactory acquisition target 35 may be imprinted on a one inch square label 30 without unduly interfering with the amount of information which can be encoded in the hexagonal array that surrounds the acquisition target. As is the case with the incomplete hexagons at the outer periphery of the label 55, the fractional hexagons contiguous with the outer boundary of the acquisition target 56 are not utilized for the purpose of encoding information. The width of each ring is desirably about the same as the side-to-side (x—x axis in FIG. 1) dimension of the hexagons, to facilitate resolution. Six rings are convenient. This is a reasonable number to facilitate location of the rings in a minimum label area with a minimum of possible false readings from "spurious" marks on the label and other "spurious" marks not on the label, such as marks elsewhere on a conveyor belt.

The acquisition target may take shapes other than concentric rings. For example, squares, spirals or hexagons may be used in order to create transitions of contrasting concentric figures, so long as linear sections through the acquisition target will create regular, predetermined and identifiable color transitions, susceptible of being sensed by an electro-optical sensor and measured by a suitable filter. It is to be noted that, although a spiral is not a collection of concentric circles, depending on the size and radius of the spiral, a close approximation of concentric circles can be achieved. A target of concentric rings is preferred, because the signal generated by a scan through their center has a frequency which is the same when sections are taken in any direction through the center of the concentric rings. This makes identification of the center simpler, as more fully described below, and allows identification of the location of the acquisition target with a one-dimension search of the analog or digital output of the scanner, although the process of the invention may alternatively or subsequently utilize a two-dimensional digital search for increased accuracy when a digital signal is being analyzed.

As used herein, "Concentric Rings" is intended to embrace complete rings, partial rings in the form of semi-circles, sectors of concentric rings occupying between 180 degrees and 360 degrees and concentric spirals which approximate concentric rings.

Since each hexagon may be encoded in three different optical properties, in the preferred embodiment, 1.585 "bits" of information may be encoded in each hexagon ($\log_2 3$). Obviously, if fewer or more optical properties than three are utilized, the number of bits encoded in each hexagon will vary commensurately. The encoding algorithm is structured to achieve close to maximum data density and to increase the number of cell-to-cell optical property transitions, in order to facilitate the two-dimensional clock recovery process described below.

Figure 4:
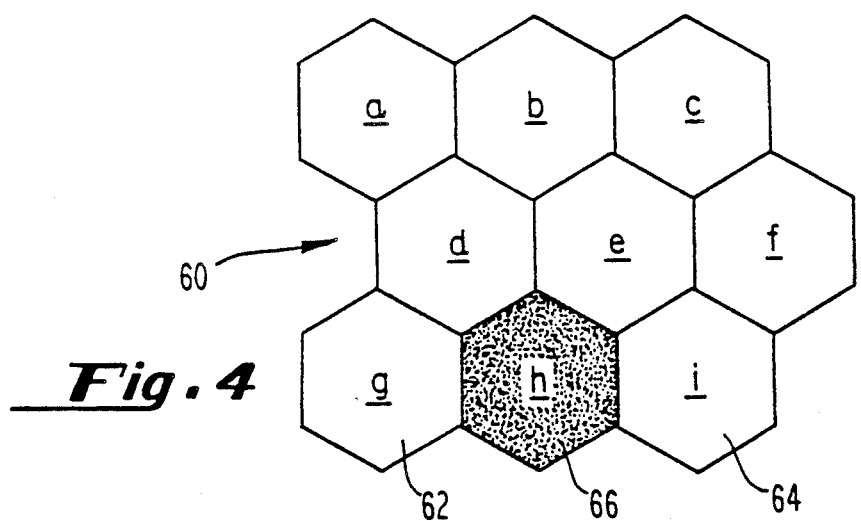
FIG. 4 is a plan view of a three cell by three cell cluster of contiguous hexagons, which may serve as the basic encoding unit of the preferred embodiment of this invention.

FIG. 4 illustrates a 3 cell×3 cell cluster of nine hexagonal cells 60, the basic encoding unit utilized in the preferred embodiment of the invention. This is a desirable encoding approach, but is not essential. Other encoding units are feasible, within the purview of the invention. As more fully described below, the 3 cell×3 cell clusters of hexagons 60 are mapped to encode 13 bits of information if the cluster contains a full complement of 9 hexagons, or less than 13 bits if the cluster is incomplete by having unusable hexagons. In a one inch square label with a data array comprising about 888 hexagons and an acquisition target occupying about 7 percent of the label area, about 1292 bits of information may be encoded.

In encoding each cluster, external, bottom hexagons 62 and 64 in each cluster 60, as seen in FIG. 4, are limited in their respective optical properties, so that they are determined always to be different from intermediate and contiguous hexagon 66. Thus, only one bit per hexagon can be encoded in hexagons 62 and 64. In this way it is possible to encode 13 bits of information in cluster 60 by encoding 11 bits onto the remaining seven hexagons. Since mapping 7 hexagons provides more possible combinations than are utilized (i.e., $3^7 = 2187$ combinations vs. $2^{11} = 2048$ combinations), some combinations are rejected as, for example, all black, all gray, all white or substantially all black, gray or white combinations. The reasons for requiring contrasting colors of hexagons 62 and 64, compared to hexagon 66 are to guarantee transitions necessary for the clock recovery step and optional normalization process step described below and to assist in determining horizontal alignment of the data array, as described below. In cases where encoding clusters have 7 or 8 hexagons, 7 usable hexagons are encoded with 11 bits and the eighth hexagon, if available, is encoded with 1 bit. For all other partial clusters 3 bits are encoded on every pair of hexagons and 1 bit onto each remaining single hexagon as more fully described below.

It will therefore be seen that the label constitutes a particularly efficient, easy-to-read (by means of appropriate scanning equipment and analytical software) label for encoding a very high density of information into a relatively inexpensive, easy-to-print label. As noted, the preferred embodiment utilizes a 33 row×30 column packing of hexagons into a one square-inch label, with an acquisition target representing approximately 7% of the total surface area of the label. In practice, 13 bits of information are obtained from a cluster of 9 hexagons, so that 1.44 bits of data are derived per cell. This is less than the theoretical 1.585 bits per hexagon because of the other constraints of the encoding algorithm, since all $3^7$ patterns are not used, and some of the least optically desirable cell-to-cell transitions are eliminated.

For reasons described below, in the preferred embodiment of the invention, it is desirable to incorporate a certain amount of error protection into the encoding of the label, so that the actual amount of recoverable information in the label is reduced in favor of a high degree of data integrity in the decoding process.

As may be readily appreciated by one skilled in the art, the foregoing discussion of label embodiments employing hexagonal cells is directly applicable to optically readable labels utilizing other polygonal cells. The disclosed methods of "printing" optical properties of hexagons apply equally to printing the optical properties of other polygonal cells, whether in black, white, gray (through half-toning) or other colors. Similar constraints and advantages as to data density enure to labels printed with polygonal cells other than hexagons when the optical properties black and white, and optionally gray, are utilized to print the polygonal cells. As with hexagon-containing labels, labels printed with other polygonal encoding cells may be "read" with scanning equipment of less complexity when only two optical properties are utilized to encode information in the polygonal cell in particular the colors black and white, because of the maximum contrast that is obtained with these colors.

Information encoding procedures and the algorithm described for hexagon-containing labels are directly applicable to labels printed with different polygonal cells. Similar to hexagon-containing labels, incomplete polygonal cells which may appear at the border of the optically readable label or that result from partial obliteration by the acquisition target, comprising a series of concentric rings are not used to encode information.

Figure 11:
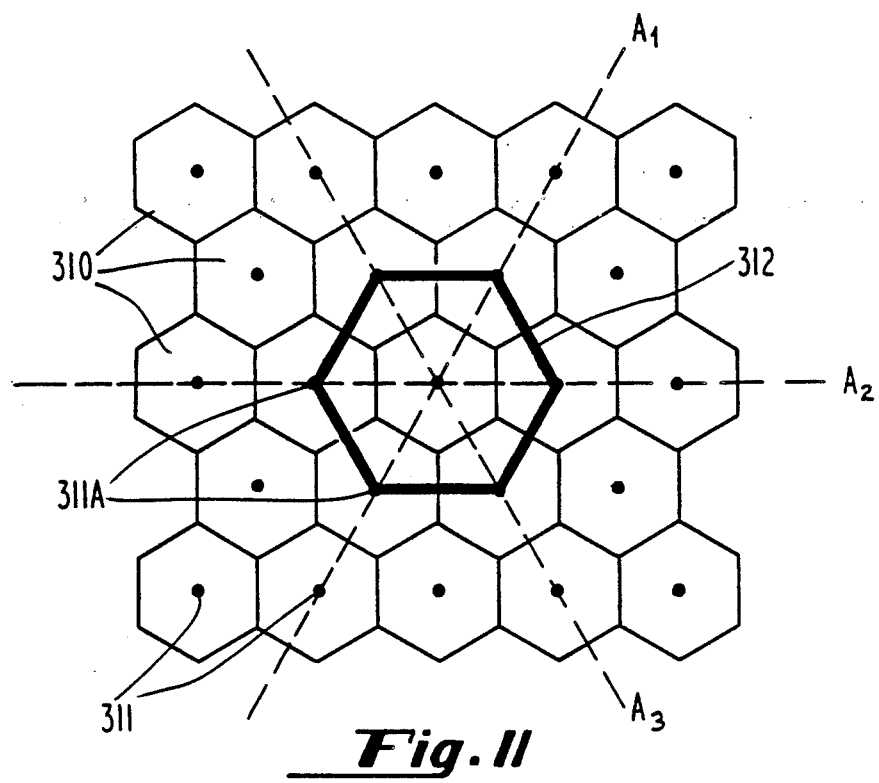
FIG. 11 is a plan view of a cluster of contiguous regular hexagons arranged with the geometric centers of adjacent hexagons lying at the vertices of a regular hexagonal array.

A "honeycomb pattern" comprises an array of contiguously-arranged hexagons 310, the geometric centers 311 of which likewise lie at the vertices 311A of a "hexagonal grid" or "hexagonal array" 312, as shown in FIG. 11. Regular hexagons, i.e. hexagons having six equal sides and six equal interior angles, form hexagonal arrays that are likewise regular in configuration, having three equally-spaced axes (A1, A2 and A3) that are spaced 60 degrees apart.

Figure 12:
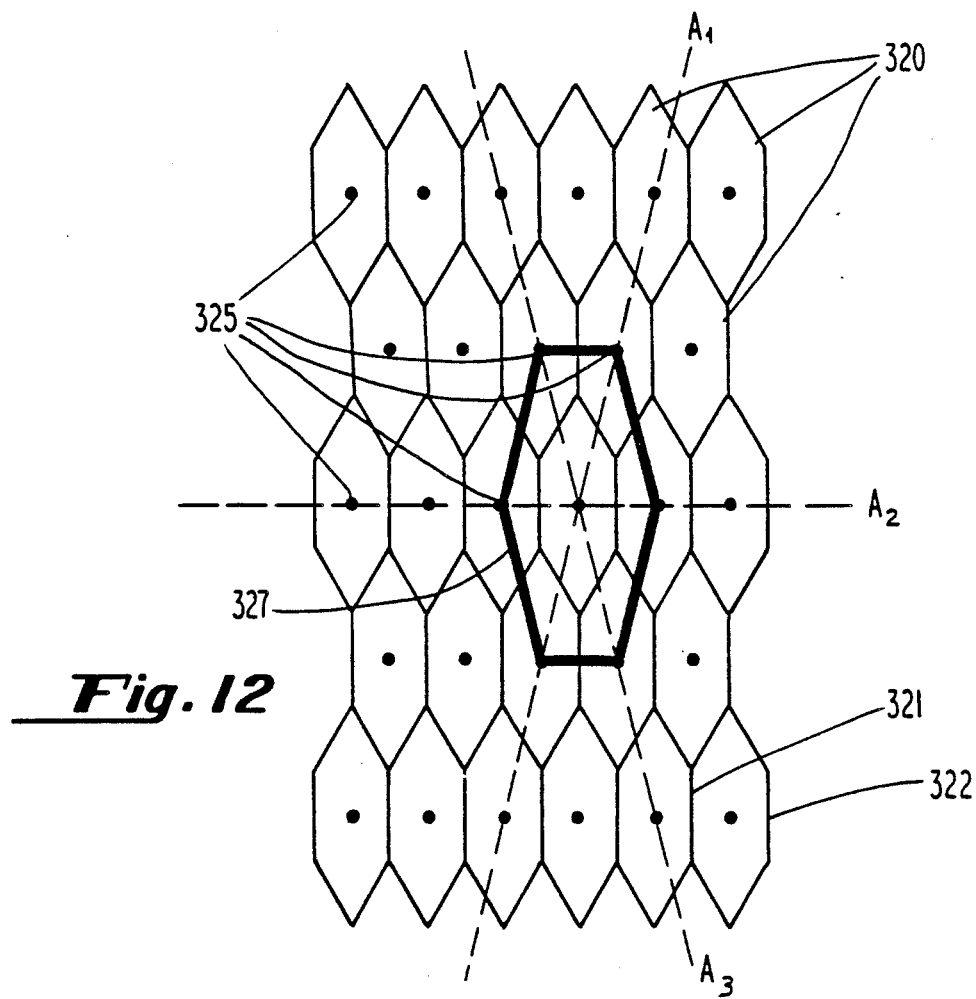
FIG. 12 is a plan view of a cluster of contiguous irregular hexagons arranged with the geometric centers of adjacent hexagons lying at the vertices of an irregular hexagonal array.

If the hexagons 320 of the label are irregular, but symmetrical, as for instance, if the hexagons are stretched along two parallel sides 321, 322, the geometric centers 325 of adjacent hexagons will describe an irregular hexagonal array 327, as shown in FIG. 12. Such an irregular hexagonal array will still have three axes (A1, A2 and A3), however, the three axes will not be equally spaced i.e. the three axes will not all be 60 degrees apart.

Although the hexagonal array of FIG. 12 is not regular in nature, it is nevertheless a two-dimensional geometric grid or array having axes of predetermined spacing. Thus, the locations and spacings of the geometric centers of the hexagons located at the vertices of the intersecting axes of the hexagonal array are also predetermined. The geometry of the hexagonal array is then utilized in the decoding process described below. Specifically, the filtration step, performed on the transformed digital data corresponding to the image sensed by the optical sensor, is adjusted to reflect the predetermined label geometry, so that the digital representation of the sensed label can be used to precisely reconstruct the original grid. The reconstruction process further supplies the missing points from the hexagonal grid. The missing grid points occur because optical property transitions did not take place between polygons of like optical properties.

With irregular hexagonal grids of the type disclosed in FIG. 12 it will be desirable to adjust the major axis determination step, step (3)(e) of FIG. 7 of the decoding process done after the Fourier transformation step of the process to identify the major axis of the optically readable label. The major axis of the label will have the geometric centers of polygons lying along this axis at different spacings than on the other two axes.

Figure 13:
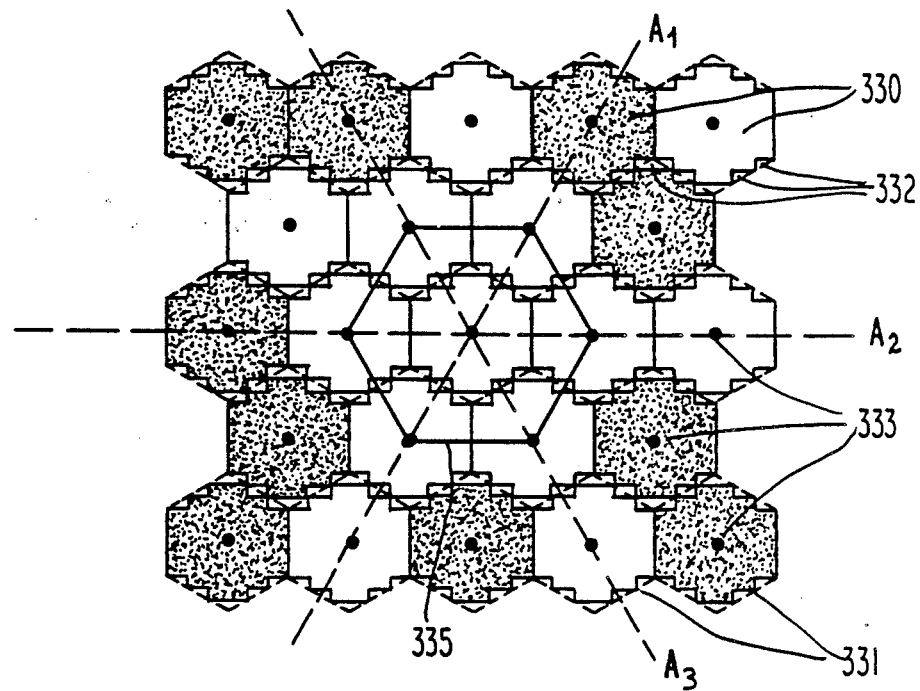
FIG. 13 is a plan view of a cluster of partially contiguous polygons substantially in the form of hexagons arranged with the geometric centers of adjacent polygons lying at the vertices of a hexagonal array.

Label configurations of the invention approximating the preferred embodiment containing hexagonal cells as described above are possible using certain polygonal cells. FIG. 13 illustrates a label configuration utilizing polygonal cells 330 which substantially resemble hexagons, but which are 20-sided polygons, rather than hexagons. Similarly constructed polygons with more or less than 20 sides could also be printed. Polygons 330 are partially contiguous unlike the imaginary contiguous hexagonal cells 331 in which they are depicted.

The interstitial spaces 332 of the FIG. 13 label embodiment may or may not be printed with a different optical property than the encoded polygons. Interstitial spaces do not carry encoded information, therefore, their presence leads to a lower data density for a given optical resolution and performance level. Further, if the interstitial spaces dispersed among polygons are of a different optical property than the adjacent polygons, more transitions between the optical properties of the polygons and the interstitial spaces could be sensed by the optical sensor and thus a higher clock signal energy would appear in the transform domain within the decoding process described in detail below.

Because the polygons of the FIG. 13 label are arranged on a hexagonal grid having three equally-spaced axes, the geometric centers 333 of the polygonal cells 330 lie at the vertices of hexagonal array 335. The spacing, location and spatial orientation of the centers of the polygons are predetermined and can be detected in the transform domain of the decoding process.

The FIG. 13 label utilizes polygons substantially in the form of hexagons. Because they so closely approximate a hexagon, the optical sensor at a moderate resolution could "read" them as hexagons. The geometric centers 333 of the polygons 330 do lie, however, at the vertices of the three equally-spaced axes (A1, A2 and A3) of the hexagonal array 335.

Figure 14:
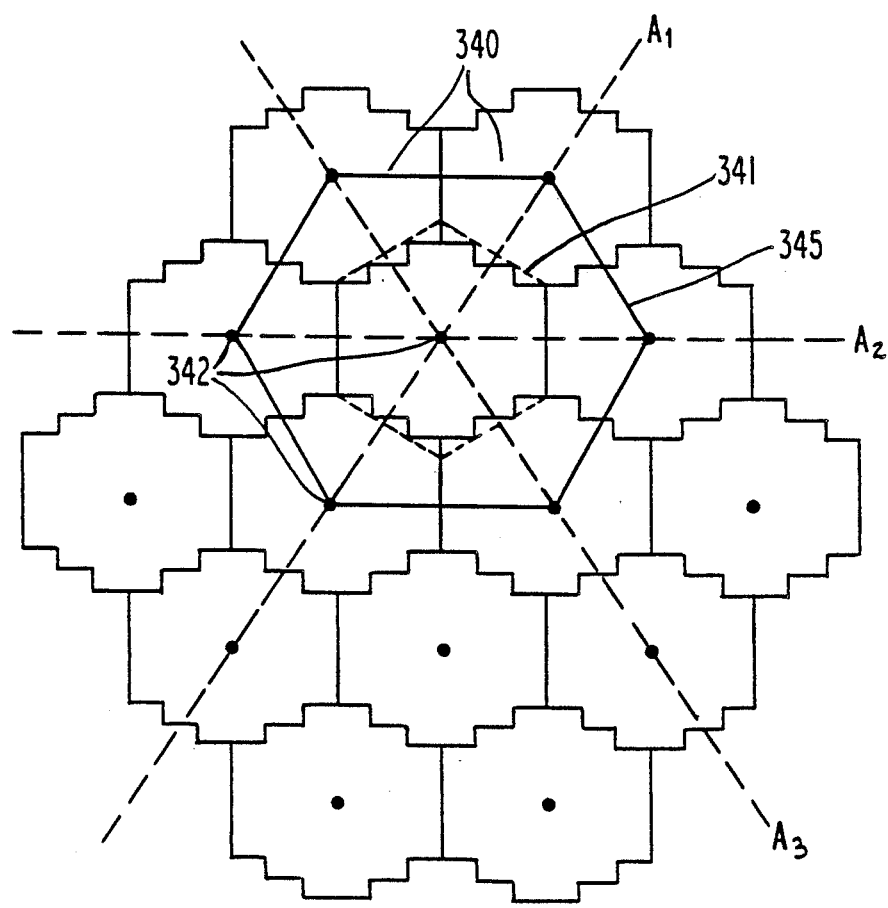
FIG. 14 is a plan view of a cluster of contiguous polygons substantially in the form of hexagons arranged with the geometric centers of adjacent polygons lying at the vertices of a hexagonal array.

FIG. 14 illustrates a similarly shaped (to polygon 330 in FIG. 13) polygonal figure 340 that has been arranged to be totally contiguous. These polygons 340 can be approximated by an imaginary hexagon 341, as in FIG. 13, but no interstitial spaces (332 of FIG. 13) may be found between the actual polygons. Such a contiguous arrangement is desirable to simplify the decoding process, but is not mandatory, in the practice of the invention. Polygons 340 are shown with their respective geometric centers 342 lying at the vertices of a hexagonal array 345. Again, as for the polygons 330 in FIG. 13, polygons 340 are substantially in the shape of hexagons, and at a moderate optical resolution would appear to be hexagons.

Figure 15:
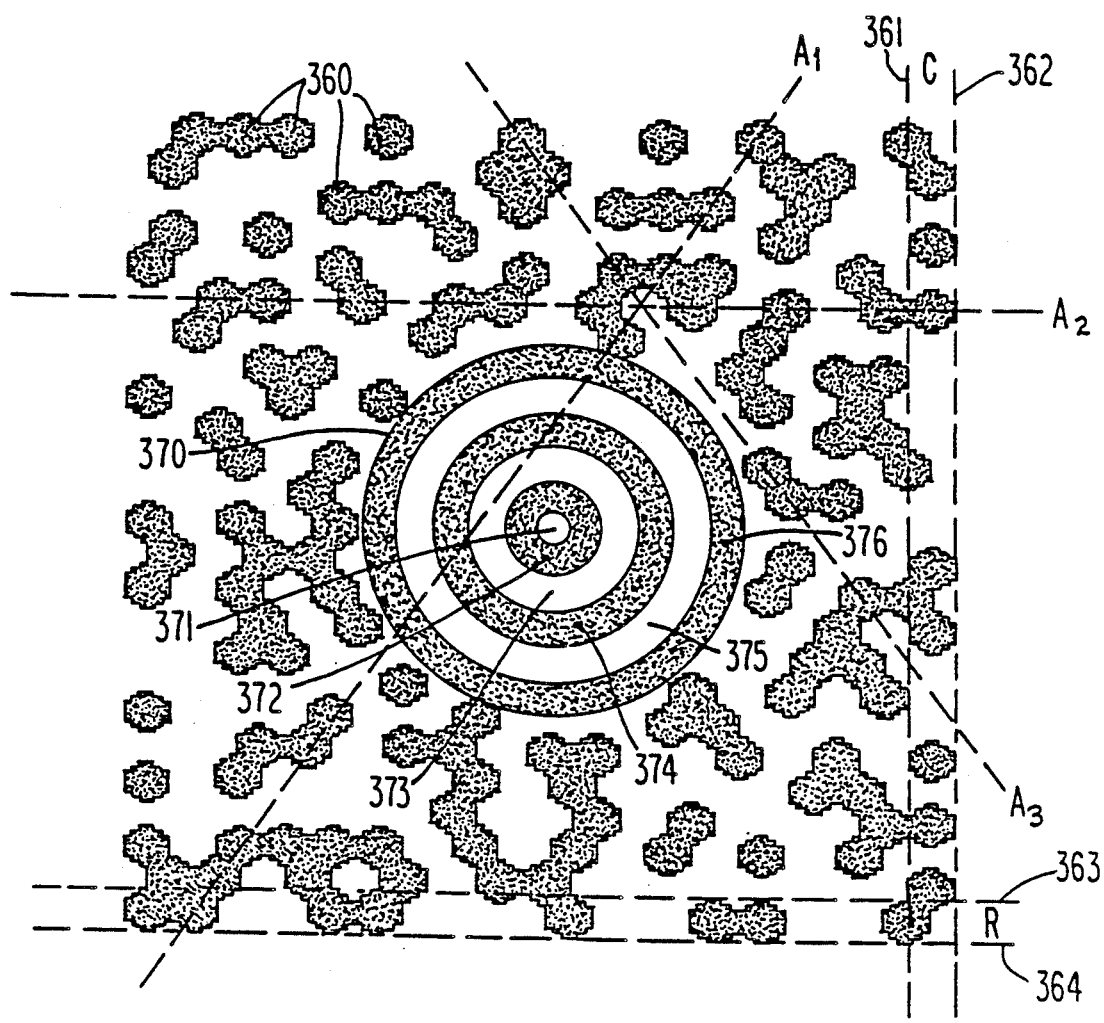
FIG. 15 is a plan view of an optically readable label having contiguous polygons substantially in the form of hexagons arranged with the geometric centers of adjacent polygons lying at the vertices of a hexagonal array and including an acquisition target in accordance with this invention.

FIG. 15 is a blowup of a label as it would appear if printed with a dot matrix printer printing 200 pixels per inch. Polygons 360 of FIG. 15 illustrate the shape of the geometric figure that will actually be printed in place of a hexagon with such a dot matrix printer, because of the pixel density of the printer. Printers with greater pixel densities should yield closer approximations of a hexagon than the polygons 360 shown on FIG. 15. Thus, polygons 340 of FIG. 14 and 360 of FIG. 15 are likely resulting shapes, due to the inherent limitations of certain printers, of the printing process for labels containing hexagonal cells or result from deliberate efforts to print such polygons substantially in the form of hexagons in the first instance. The shape of such polygons substantially in the shape of hexagons allow them to function, in a practical sense, as equivalents of contiguous hexagonal encoding cells.

As in the case of FIG. 3, the optically readable label of FIG. 15 also contains an acquisition target 370 comprising a series of concentric rings 371 through 376. Like the hexagons on the label of FIG. 3, the polygons 360 substantially in the form of hexagons in FIG. 15 are arranged in columns "C" and rows "R," as bounded by imaginary lines 361 and 362 and 363 and 364, respectively. Also, as in the case of the hexagons of FIG. 3, the polygons of FIG. 15 have their respective geometric centers lying at the vertices of a hexagonal array as defined by equally-spaced axes A1, A2 and A3. Thus, labels of the configuration shown in FIG. 15 are readily encoded and decoded in accordance with the processes disclosed hereinbelow.

If an alternative label geometry is employed such as utilizing a square or rectangular array, or the like, adjustments must be made in the two-dimensional clock recovery process described below. The different geometry of the predetermined array requires changes to be made in the filters utilized in the filtering step of the two-dimensional clock recovery process. The filters operate on the transformed digital data corresponding to the optical properties of the polygons read by the sensor in the image domain. Such minor adjustments to the filtration scheme could easily be made by a person of ordinary skill in the art. In situations where the predetermined two-dimensional array has unequally-spaced axes, or is irregular in configuration, it may be desirable to identify the major axis of the label prior to performing the Fourier transformation of the digital data representing the optically sensed image. This is because the geometric centers of the polygons are not equally spaced along the axes.

Figure 16:
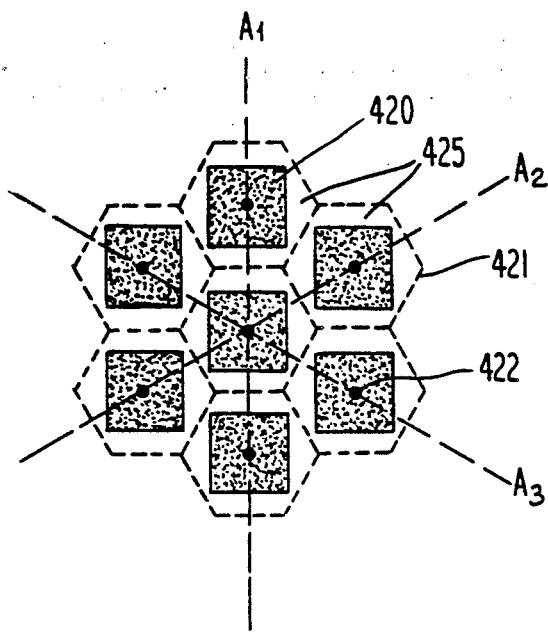
FIG. 16 is a plan view of a cluster of contiguous equalateral squares arranged with the geometric centers of adjacent squares lying at the vertices of a hexagonal array.

Noncontiguously-arranged polygons can also be utilized to create an optically readable label in accordance with the present invention. FIG. 16 illustrates a hexagonal array of squares 420, which are noncontiguously arranged with their respective geometric centers 422 lying at the vertices of a hexagonal array formed by the three equally-spaced axes A1, A2 and A3. It is apparent that the configuration is a hexagonally-based configuration from the grid of imaginary hexagons 421 which can be overlaid upon the polygons 420, thereby forming interstitial spaces 425.

Figure 17:
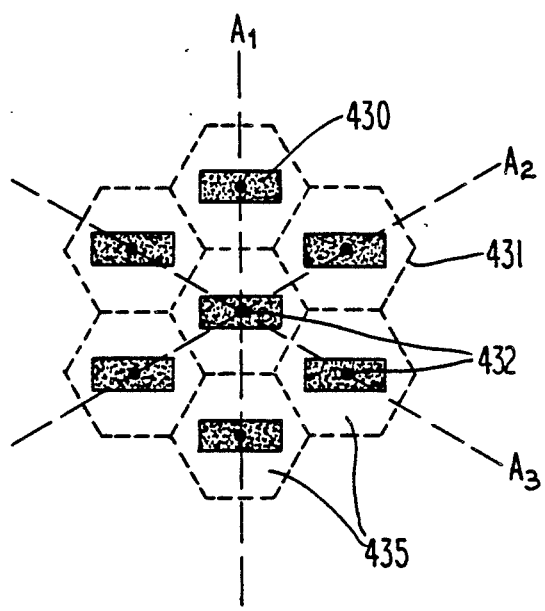
FIG. 17 is a plan view of a cluster of noncontiguous rectangles defining interstitial spaces among said rectangles with the geometric centers of adjacent rectangles lying at the vertices of a hexagonal array.
Figure 18:
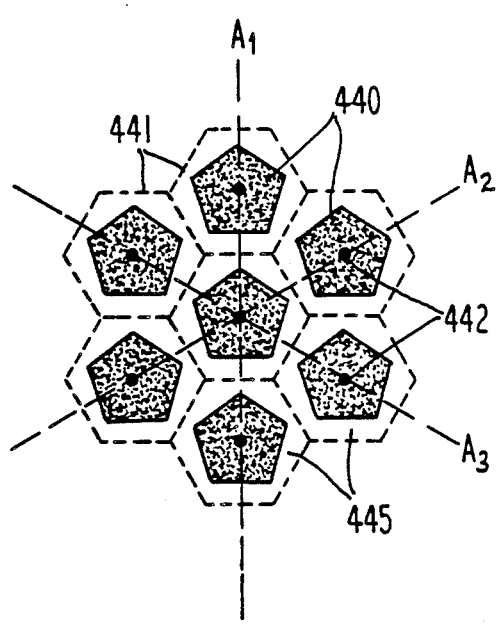
FIG. 18 is a plan view of a cluster of noncontiguous pentagons defining interstitial spaces among said pentagons with the geometric centers of adjacent pentagons lying at the vertices of a hexagonal array.

Similar arrays to the square 420 shown in FIG. 16 may be constructed using rectangles. FIG. 17 illustrates a multiplicity of rectangles 430 arrayed with the geometric centers of adjacent rectangles lying at the vertices of a hexagonal array formed by intersecting axes A1, A2 and A3. Again, visualization of the hexagonal arrangement is aided by the imaginary hexagons 431 in FIG. 17 overlaid upon the noncontiguous rectangles 430, thereby creating interstitial spaces 435 between rectangles 430. FIG. 18 likewise illustrates a noncontiguously-arranged label comprising pentagons 440 having the geometric centers 442 of adjacent pentagons 440 lying along the three equally-spaced axes A1, A2 and A3. The geometry of the noncontiguous pentagons is more easily visualized by overlaying the pentagons 440 with imaginary hexagons 441, thus forming interstitial spaces 445 between pentagons 440.

Figure 19:
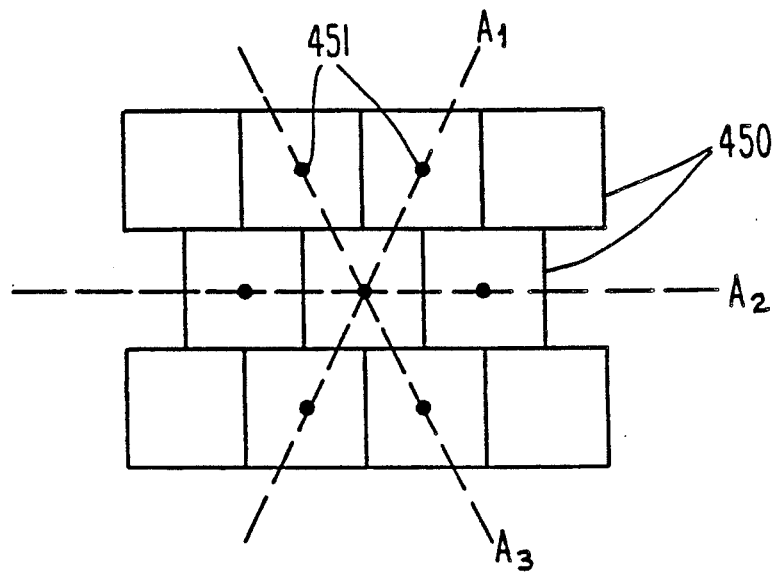
FIG. 19 is a plan view of a cluster of contiguous rectangles arranged in staggered rows and columns with the geometric centers of adjacent rectangles lying at the vertices of a hexagonal array.

Alternative hexagonal arrays may be constructed where the axes of the array A1, A2 and A3 are equally spaced, but do not correspond to the axes of symmetry of the polygonal figures themselves. Instead, the geometric centers of adjacent polygons lie at the vertices of the intersecting axes of the array. Such an arrangement is illustrated in FIG. 19, comprising a series of contiguous rectangles 450, having the geometric centers 451 of adjacent rectangles lying along axes A1, A2 and A3.

Figure 20:
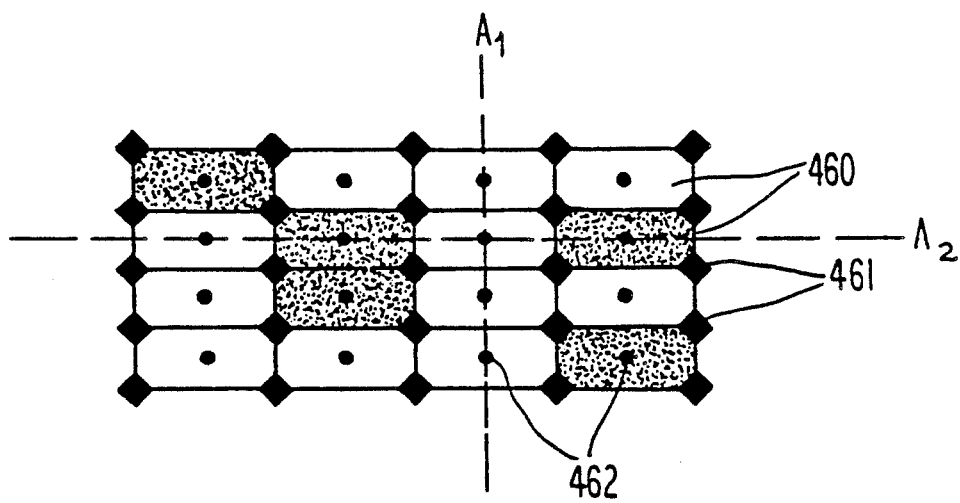
FIG. 20 is plan view of a cluster of partially contiguous octagons defining interstitial spaces among said octagons with the geometric centers of adjacent octagons lying at the vertices of a rectangular array.

Higher order polygons may be similarly arrayed on a predetermined two-dimensional grid. FIG. 20 shows a series of partially contiguously-arranged octagons 460 defining a multiplicity of interstitial spaces 461 among said octagons 460. The centers 462 of adjacent octagons 460 are located at the vertices of intersecting axes A1 and A2, thus forming an array of octagons 460, which may be used in the practice of the invention. Interstitial spaces 461 may be printed with an optical property different than is used for octagons 460. However, this is not mandatory in the practice of the invention, since it is the location, orientation and intensity of the optical property at the center of the octagons 460, lying at a predetermined position on the hexagonal array formed by axes A1 and A2, that is most important in the decoding process.

It will be appreciated that although a preferred embodiment of the label has been disclosed and described, many variations of the label are possible without departing from the spirit or scope of this invention. For example, the label need not be one-inch square. One square inch was selected as a reasonable size of label, to achieve an acceptable data density of 100 alphanumeric characters of information with a high degree of error protection applied thereto, without creating an excessively large size label. It is desirable to have a one square inch label, to reduce the paper and other costs associated with the printing, shipping and handling of such labels. Conventional bar code labels of similar size would have a radically decreased data density. Using 4, 5 or more optical properties or colors to define the hexagons will allow substantially more information to be packed into a given space of hexagons of pre-determined size, but with a resulting increase in the complexity of the software and sensitivity of the scanning system required in order to be able to recover that information. Thus, for practical purposes, a three optical property, black, gray and white, encoding system of optical properties is highly desirable. Also, the sizes of the hexagons and acquisition target may be varied widely within the spirit and scope of this invention.

Although "clustering" of hexagons in 3 cell×3 cell clusters has been described, other patterns of clusters may be used or clustering may be omitted entirely and the encoding algorithm may be directed specifically to an individual hexagon pattern. Also, the relative amounts of encoded information devoted to the message as opposed to error correction may also be varied within wide limits within the spirit and scope of this invention.

LABEL ENCODING

Described below is the encoding process of this invention, as applied to the preferred label embodiment. It will be understood that the preferred embodiment is being disclosed and that numerous combinations, variations and permutations are feasible within the purview of this invention.

The process may begin with a predetermined series of data desired to be encoded on a label. In a preferred embodiment, the label is a shipping label, and the data is broken into two fields, identified as a "high priority message" and a "low priority message." It will be understood, however, that the invention is not restricted to two different messages or levels of priority. Many messages and levels of priority may be created within the quantitative limits of a label of given size and number of cells.

For example, where the label is intended as a shipping label, the "high priority message" may constitute nine characters, representing the zip code of the recipient of the intended package, parcel or letter. Nine digits is referred to because, although many individuals and companies have five digit zip codes, nine digit zip codes are being used with increasing frequency. Therefore, in handling packages for delivery, the most important piece of information is the zip code. This determines the general destination of the package and allows various scanning and package control systems to be used to direct the package to the proper destination on trucks, aircraft, in a conveyor system and the like.

The low priority message may, for example, include the name and shipping address, including zip code, of a recipient of the intended package, as well as billing information.

The reason for creating a high priority message and a low priority message is to protect the high priority message with extra error correction, to allow the high priority message to be placed (encoded) in a more central area of the label, where it is less likely to be damaged or destroyed, and to permit the high priority message to be repeated and distributed in the low priority message so that, even if the high priority message is selectively destroyed, there is a high possibility that the high priority message can be retrieved from the low priority message. By locating the high priority message in a central area, it may only be necessary to decode the high priority message for some purposes, so that only a portion of the label needs to be processed, thus speeding up processing time. This will occur, for example, when a parcel is on a conveyor and only the zip code needs to be determined to control which of several conveyor paths the parcel should take in the handling process.

Because it is of a lower priority, the low priority message is not presented twice on the label. However, as described below, both the high priority and the low priority messages may incorporate various error protection codes and correction capabilities, in order to maximize the likelihood that both messages may accurately be retrieved.

The use of error protecting characters as part of the encoded information can, in the preferred embodiment of this invention, in combination with an appropriate stored program and computer, cause the system to correct an error during the decoding process, in the manner described below. The use of error protecting codes is well known in the art and is within the purview of the skilled person in the art.

In the practice of the invention an operator creating a label may manually input the data to a suitable computer terminal which is designed, in the manner described below, to activate a printer to print a label with the high priority message and the low priority message suitably encoded in the hexagons of the label. It is not essential to the invention that a high priority message and a low priority message be created, but it is desirable in order to maximize the likelihood that the most important data to be encoded will be retrieved. In the preferred embodiment the label is also printed with a centrally-located acquisition target comprising a plurality of concentric rings of two alternating contrasting colors, the colors preferably being two of the colors utilized to print the individual hexagons, and most preferably black and white to ensure maximum contrast.

The operator manually inputting this data will cause a suitably programmed computer to encode each character of the input message and use suitable field designators, in order to create, in the operated computer, a binary bit stream, representing the characters of the message and suitably encoded by field to designate the high priority and low priority messages and the relative position of each. This operation is carried out by the program "TEXTIN.C" which may be found in the Microfiche Appendix, page 1, lines 8 to 54; page 2, lines 1 to 54; and page 3, lines 1 to 36; and is designated 110 on FIG. 9. A computer with the required features may be a Compaq Deskpro 386 (with a 16-MHz clock and an Intel 80387 math coprocessor chip).

Alternatively, the process may begin with the information to be encoded already contained in a binary bit stream, because, for example, it was received from a storage medium or otherwise created. Therefore, the message to be encoded can exist in a form which is manually (with electronic assistance) converted to a binary bit stream or which begins as a binary bit stream.

Figure 5:
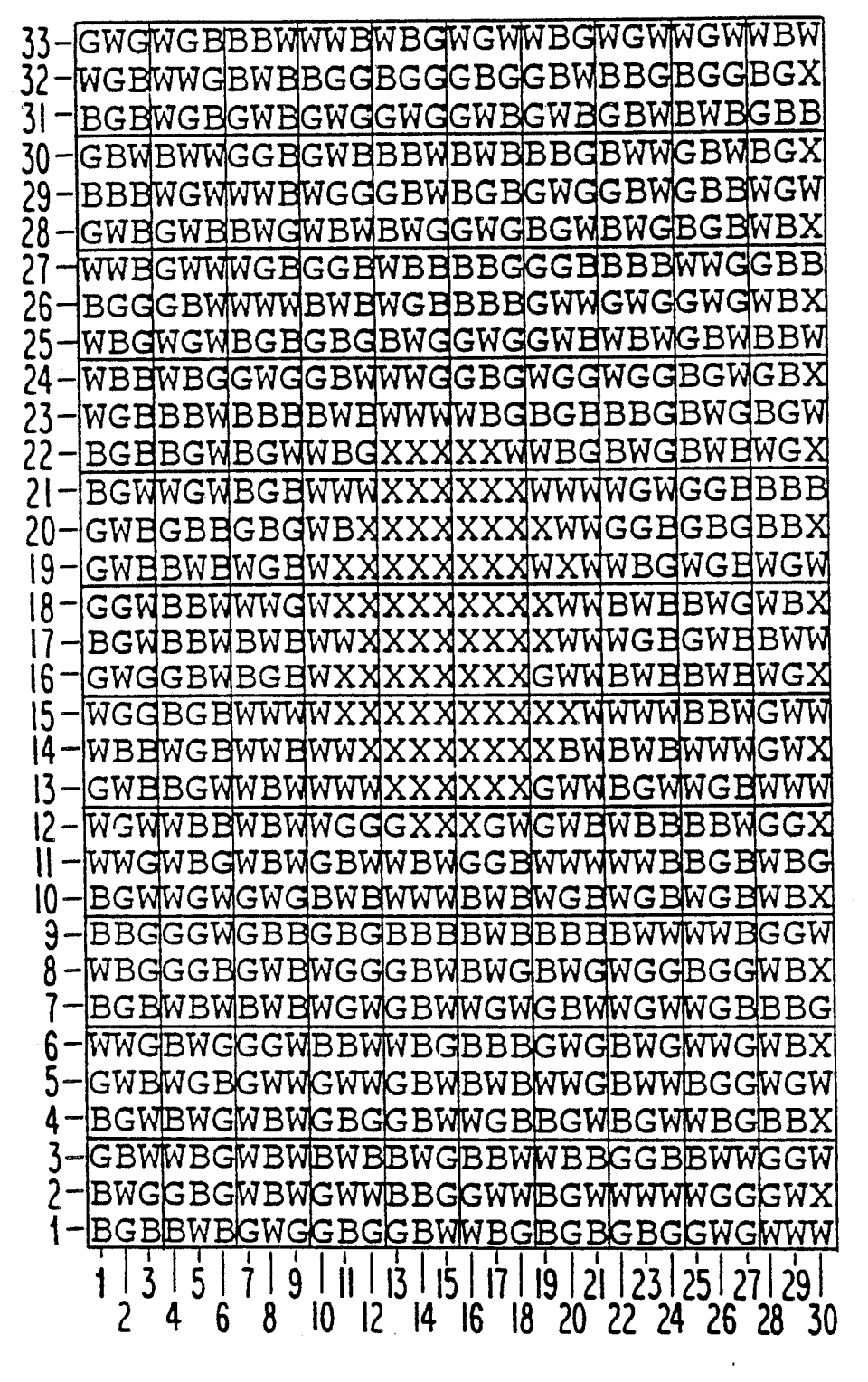

Once the binary bit stream has been created or an error-protected bit stream has been produced by the steps discussed more fully below, the bit stream must be mapped in accordance with a predetermined mapping pattern for the encoding of the hexagon honeycomb of this invention. FIG. 5 is a "cluster map" which shows the individual hexagonal cells of 3 cell×3 cell clusters aligned in a grid or honeycomb containing 33 rows and 30 columns of hexagons. Each row is numbered, and each column is numbered. The row numbers range from 1 to 33, and the columns range from 1 to 30. It can be seen that certain of the hexagons designated along the upper surface and right-hand surface of the region map, and within the geometric center of the grid are designated by X's. This indicates that these hexagons do not contain bit-mapped information. This is because the exterior X's represent partial hexagons at the edge of the label, thus causing each of these rows to each have one fewer hexagon. The interior hexagons designated by X's represent spaces either occupied by the acquisition target or incomplete hexagons around the perimeter of the acquisition target, so that these interior hexagons indicated by X's are not bit-mapped. All of the hexagons which are not identified with X's are capable of recording information. In accordance with the preferred embodiment, each of these spaces will be occupied by a black (B), white (W) or gray (G) hexagon. As noted above, although various clustering and mapping techniques can be utilized, the application of this invention may use clusters of 9 hexagons in 3 rows of 3 hexagons each to define specific bits of information, and, as also described above, 13 bits of information are desirably encoded in each such 9-hexagon cluster.

In a data array comprising 33 rows and 30 columns of contiguous hexagons, a grid of 11 rows by 10 columns of hexagon clusters each containing a 3 cell×3 cell arrangement of contiguous hexagons, is formed and may be visualized in connection with FIG. 5. It will be appreciated however that every row of 3 cell by 3 cell clusters within the 11 cluster×10 cluster grid will contain a cluster of either 7 or 8 hexagons because of the geometric packing of hexagons, and the number will alternate from row to row. Thus, 6 clusters containing 8 hexagons and 5 clusters containing 7 hexagons result from this arrangement. Also, the centrally located acquisition target creates additional incomplete clusters. FIG. 5 thus provides a graphic representation of usable clusters of hexagons available for encoding with bits of information in a 33 row by 30 column data array of contiguous hexagons.

With reference to FIG. 4, clusters with nine usable hexagons are encoded utilizing the following algorithm:
  Take eleven bits of information and map them into the set of seven hexagons identified as a, b, c, d, e, f and h.

Hexagons g and i are used to represent 1 bit each in such a way as to guarantee that each of them is different from hexagon h.

Thus, thirteen bits of information are encoded in a complete 3 cell×3 cell cluster of nine contiguous hexagons.

For partial clusters of 7 or 8 usable hexagons:

Take eleven bits of information and map them into the set of the first seven usable hexagons.

The eighth hexagon, if available, is used to represent one bit.

For all other partial cells:

Map three bits of information into as many pairs of hexagons as possible.

Any remaining single hexagons are used to represent one bit.

Figure 9:
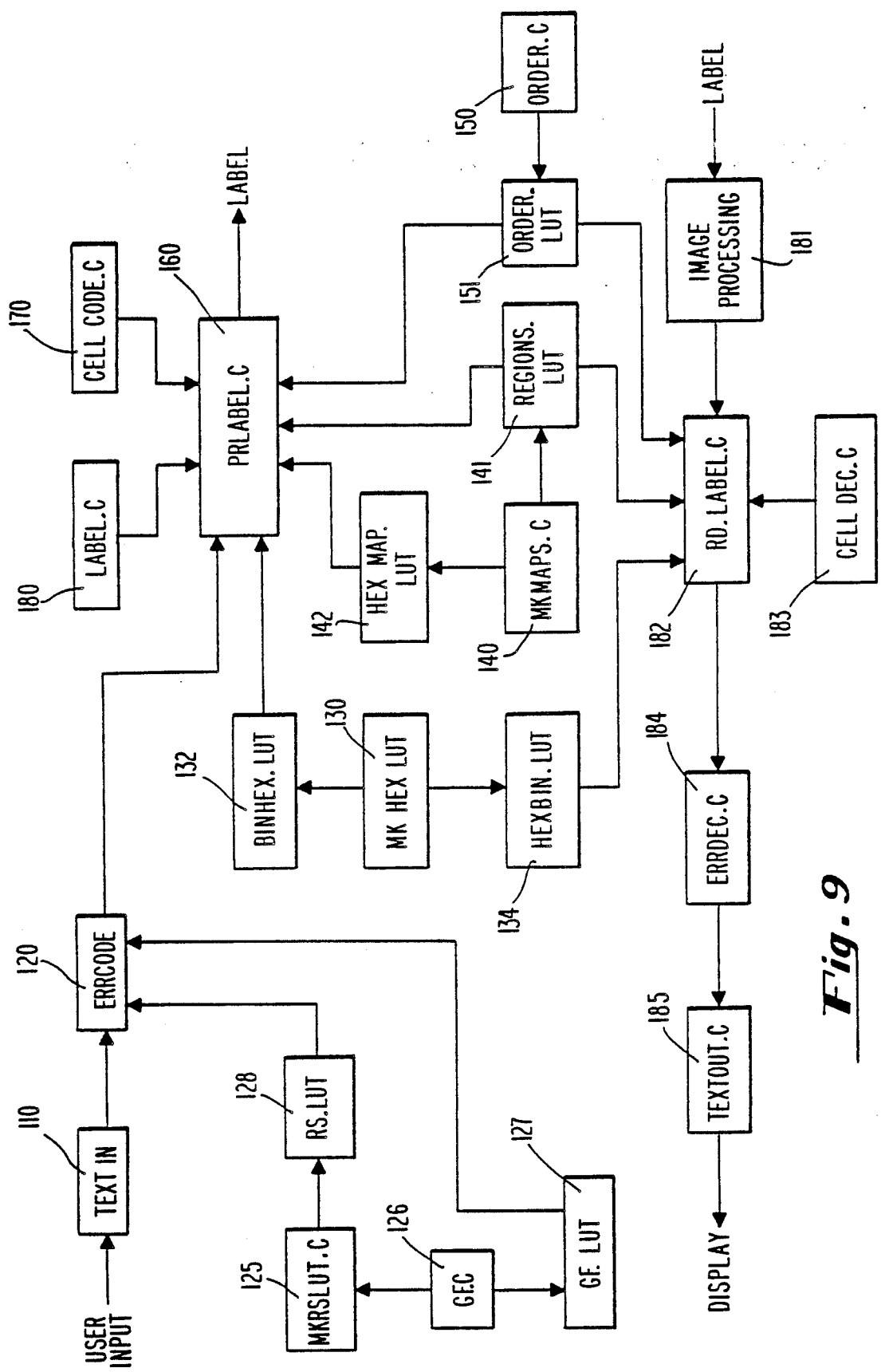
FIG. 9 is a flow chart showing the encoding and decoding program structure and data flow.

Since mapping seven hexagons provides more combinations than eleven bits (i.e., $3^7 = 2187$ vs. $2^{11} = 2048$), some combinations of the hexagons need to be rejected. The rejected combinations are chosen to be those that provide the fewest number of transitions. To implement this, look-up tables were created to map the clusters in accordance with FIG. 5. The creation and use of these look-up tables is within the capabilities of a skilled programmer. With reference to FIG. 9, the program for creating the look-up tables "BINHEX.LUT" 132 and "HEXBIN.LUT" 134 may be found in the Microfiche Appendix, page 4, lines 3 to 52; page 5, lines 1 to 53; and page 6, lines 1 to 34, and is identified as "MK HEX LUT" 130.

Use of this bit allocation scheme allows 1292 bits of information to be encoded in a 33 row×30 column data array of contiguous hexagons.

The sequence in which the high priority information and low priority information is located throughout the cluster map is predetermined, depending upon:

(a) The size of the high priority message;
(b) The size of the low priority message; and
(c) The optimum location for the high priority message in a protected place.

Utilizing the cluster map as illustrated in FIG. 5 as a template, a stored mapping program "MKMAPS.C" 140 operating on the digital data contained in a storage medium makes a predetermination of how to distribute the information—both the high priority message and the low priority message—throughout the cluster map, as more fully described below. The mapping program is identified in the appended source code listings as "MKMAPS.C38 140 and may be found in the Microfiche Appendix, page 19, lines 3 to 53; page 20, lines 1 to 53; page 21, lines 1 to 53; and page 22, lines 1 to 42.

In order to minimize the likelihood of error, and be able to correct errors, the preferred embodiment of the invention desirably includes extensive error protection and correction capabilities. For example, in a preferred embodiment having 1,292 bits of information able to be encoded in a one square inch array of hexagons having 33 rows×30 columns of hexagons, and an acquisition target occupying about 7% of the label area, it is desirable to utilize 36 high priority message information bits to encode a 9-digit zip code plus one additional alphanumeric character, which may represent a shipping code. In this example, it would also be desirable to use 120 check bits for the high priority message. This is determined by the amount of error correction capability desired. Similarly, in the illustrative embodiment, 560 bits of low priority message are included; this includes 40 bits of high priority message which is incorporated in the low priority message. In the example, 576 low priority message check bits will be added in order to maintain the security and facilitate recovery of the low priority message. This example illustrates the much more lavish use of check bits in order to preserve and permit recovery of the high priority message as opposed to the low priority message. It is to be understood that the foregoing information is by way of example only and that the high priority message could be longer or shorter, the low priority message longer or shorter, and the number of check bits greater or fewer, depending upon the particular application of the invention.

A "systematic code" takes a specific message sequence and adds a distinct error check sequence to the message sequence. A "non-systematic" code takes a specific message sequence and incorporates the error check sequence with the message sequence so that the message is no longer distinct, but is, of course, recoverable. It is within the purview of this invention to use either systematic or non-systematic coding for error protection. The disclosure below is of a systematic code.

As defined herein, the step of "interposing error detection symbols" includes systematic and/or non-systematic coding systems.

Various systematic linear cyclic error protection codes are known in the art, for example, BCH codes, Reed-Solomon codes and Hamming codes. In a preferred embodiment, Reed-Solomon codes are separately incorporated to protect the integrity of the high and low priority messages. Reed-Solomon codes are very efficient and most useful when multi-bit characters are being error-checked. Reed-Solomon codes are well known and it is to be understood that this is simply a preferred embodiment, although many other error correcting codes could be utilized in the invention. Reed-Solomon and other coding systems are discussed in, for example, *Theory and Practice of Error Control Codes*, Richard E. Blahut, Addison Wesley, 1983, at pages 174 and 175.

By way of example, some relevant information about the Reed-Solomon code is set forth below. Specific characteristics of a Reed-Solomon code can be specified by the following parameters:

m = number of bits in each symbol
n = number of symbols in the block $= 2^m - 1$
k = number of message symbols (number of message bits = km)
t = correction capability in number of symbols = (n−k)/2

A nine-digit zip code and single alphanumeric character for further identification purposes requires 36 bits without error protection in the example described below. A Reed-Solomon code with the following parameters was chosen for the high priority message.

m = 6 (6 bit symbols)
n = $2^6 - 1 = 63$
t = 10
Therefore, k = n − 2t = 43

Since only six 6-bit symbols are required to represent a 36-bit message, the remaining 37 symbols (43−6) are padding symbols, which are implied between the encoder and the decoder, and need not be stored on the label. Thus, the total number of bits required on the label for the high priority message is (63−37)×6 or 156 bits.

This error coding scheme will be able to correct a maximum of up to 60 (10×6) bit errors, which amounts to 38.5% of the bits used. Due to the large number of implied padding symbols, the large error detection capability of this Reed-Solomon encoding makes it extremely unlikely that the high priority message will be read erroneously.

The low priority message was encoded with a Reed-Solomon error protection code having different parameters, namely:

m=8(8 bit symbols)
n=$2^8$−1=255
t=36
k=n−2t=183

Since there are 1292 bits available for encoding on the label according to this illustration, a total of 1136 bits (1292−156 high priority message bits and check bits) are available for encoding and check bits for the low priority message. Thus, the remaining 904 bits (255×8−1136) have to be implied padding bits. This allows 560 bits (183×8−904) for the information content of the low priority message and 576 check bits.

To further ensure recovery of the high priority message it is also included in the low priority message. The Reed-Solomon error protection code applied to the low priority message permits encoding of an additional 86 6-bit alphanumeric characters and has a maximum error correction capability of about 25.4%.

Utilizing the foregoing Reed-Solomon error protection encoding, the total number of 1292 bits of information available on the illustrative label are distributed as follows:

36 high priority information bits
120 high priority check bits
560 low priority information bits (including 40 bits of high priority message incorporated in the low priority message)
576 low priority check bits The bit stream of data, including the appropriate check bits for preserving the information, are assigned to individual hexagons on the cluster map of FIG. 5. It will be appreciated that a wide variety of distribution patterns can be utilized, recognizing that the important criteria to be determined are:

(1) safe location of the high priority message proximate the acquisition target (if present on the data array); and
(2) creating a pattern which is reasonably easy to reassemble when reading occurs.

The specific error coding program employed in the illustrative example is contained in the Microfiche Appendix under the program "ERRCODE.C" at page 15, lines 1 to 52 and page 16, lines 1 to 50.

Encoding for Reed-Solomon codes requires multiplication of the message code vector with a generator matrix. The matrix multiplication is done using Galois Field arithmetic. Addition of any two elements of the field is obtained by performing an exclusive "or" operation between the two elements. Multiplication is performed via a "log" operation in the Galois Field. The log and antilog are obtained by using look-up tables generated from prime polynomials, specifically for the high priority message: 1+$x^6$; and for the low priority message: 1+$x^2$+$x^3$+$x^4$+$x^8$. With reference to FIG. 9, an auxiliary program "GF.C" 126 generates the look-up tables necessary for the Galois Field arithmetic. Auxiliary program "GF.C" may be found within the Microfiche Appendix at page 8, lines 1 to 53 and page 9, lines 1 to 32. The look-up tables are computed and stored in the file "GF.LUT" 127 for use during encoding and decoding. The generator polynomial g(x) for the Reed-Solomon code is determined by the following equation:

$$g(x)=(x+a)(x+a^2)(x+a^{2t})$$

where a is the primitive element of the Galois Field.

The generator matrix for the Reed-Solomon code is formed by performing a long division for each of the rows of the generator matrix. The kth row of the generator matrix is given by the remainder obtained from performing a long division of $x^{n-k-i}$ by g(x).

The computation of the generator polynomials g(x) as well as the generator matrices for both the high priority and low priority messages is implemented according to the auxiliary program "MKRSLUT.C" 125, which may be found in the Microfiche Appendix, page 10, lines 1 to 52; page 11, lines 1 to 53; page 12, lines 1 to 54; page 13, lines 1 to 52; and page 14, lines 1 to 4. The look-up tables for the generator matrices are generated and stored in the file "RS.LUT" 128.

In a preferred embodiment of the invention, labels containing hexagons are printed with standard printing equipment that is readily available and inexpensive. A printer having a 300×300 dot matrix per square inch capability will yield satisfactory results for printing three-color (black, gray, white) labels having 888 hexagons plus a centrally-located acquisition target. A printer with these capabilities is the Hewlett Packard Laser Jet Series II with 0.5 megabytes of memory and a 300 dot per inch graphics resolution. A 300×300 pixel grid having a density of 90,000 pixels per square inch produces about 90 pixels per hexagon in the preferred embodiment. Each pixel is assigned a value of 0 or 1, representing a black or white pixel. This printer is utilized to print a two-color data array of black or white hexagons. It may also be used to print a three-color data array of black, white and gray hexagons if a half-toning algorithm is utilized to produce gray hexagons, as previously described.

Referring to FIG. 9, by means of a stored program "MKMAPS.C," 140 a regions look-up table "REGIONS.LUT" 141 of 34 rows ×30 columns was created, which is analogous to FIG. 5, but which was adapted to designate selection of black or white for the acquisition target rings. Individual hexagons are coded for black, white and gray or as unusable. A separate look-up table "HEX MAP.LUT" 142 was created by a stored subroutine of the program "MKMAPS.C" which specifies allegiance of each of the 300×300 pixels on the pixel grid to specific regions in the "REGIONS.LUT" 141, i.e., about 90 pixels per hexagon. Pixels belonging to the finder rings are coded for either black or white. Acquisition target rings are printed by first generating a hexagonal pattern on each region row then generating the rings. Regions partially or completely covered by the finder rings are rendered unusable in the "REGIONS.LUT" 141. The foregoing program "MKMAPS.C" and subroutines may be found in the appended source code in the Microfiche Appendix, pages 19 through 22.

The error protection encoded bit stream is mapped in accordance with a predetermined sequence into the 11×10 cluster array of hexagons. Still referring to FIG. 9, the sequence is specified by an order look-up table "ORDER.LUT" 151 generated by an auxiliary stored program entitled "ORDER.C", 150 which may be found in the Microfiche Appendix, page 26, lines 1 to 47 and page 27, lines 1 to 3. A stored program "PRLA- BEL.C"160 and found within the Microfiche Appendix at page 17, lines 1 to 54 and page 18, lines 1 to 39, was utilized to assign values of 0, 1, or 2 to the regions available for printing on the label, while leaving the regions with a value of 3 unchanged. Gray levels for each of the hexagons in a 3 cell by 3 cell cluster are assigned in conjunction with the stored program entitled "CELL CODE.C" 170 found in the Microfiche Appendix, page 23, lines 1 to 53; page 24, lines 1 to 53; and page 25, lines 1 to 43.

A preference for storing the high priority message in an area proximate the acquisition target where it will be less susceptible to label degradation is built into this auxiliary order program. Program "LABEL.C" 180 is therefore employed to generate a bit stream suitable for input to the laser printer. Program "LABEL.C" 180 may be found in the Microfiche Appendix, page 28, lines 1 to 53; page 29, lines 1–52; and page 30, lines 1–36.

It can be seen that the use of black, gray and white permits a simple label printing procedure, because only black ink is necessary, when a standard half-toning algorithm is used, in a manner which is well known in the art. If other color combinations are used (which is feasible), the necessity for printing in other colors obviously creates substantial complexities when compared with the three-color black-gray-white approach or with a two-color black-white approach.

Thus, when each pixel of the printer has been assigned a black or white value, the labels may be printed to create an encoded format, as illustrated in FIG. 3, in which some hexagons are white some are gray and some are black, and in which an acquisition target region, preferably of black and white concentric rings is formed at the geometric center of the label.

LABEL INTERPRETATION OR DECODING

Having described how data is encoded in the label and printed, it is necessary to describe the subsequent label interpretation or decoding process. It will be appreciated that it is desirable to perform the label interpretation function at very high speeds, on the order of a fraction of a second, in order to increase the efficiency at which the package manipulation (or other manipulation or label reading) process takes place.

There are two basic approaches that can be taken for capturing the image in the label reading process. The label can be read at relatively slow speeds, using a handheld static fixed-focus scanner. Alternatively, an electro-optical sensor, having a servo-controlled focusing mechanism to permit dynamic scanning of rapidly moving packages of variable sizes and heights is highly desirable to achieve high speed operation. The decoding process and equipment described below was demonstrated in connection with a fixed-focus scanner. The process having the general capabilities described herein with respect to a static fixed-focus scanner is adaptable to a dynamic scanning system with certain modifications to the optical system as noted below. When manipulating packages at high speeds, it is desirable to have a high speed scanning mechanism which can read labels travelling at a linear speed of about 100 inches per second or more and passing below a fixed scanner location. The image processing function thus comprises the following steps. FIG. 7 provides an outline of the steps of the decoding process.

1. Illumination of the Label

When a package, parcel or letter is traveling on a high-speed conveyor, the area to be illuminated is quite large, because the sizes of the packages to be accommodated on the conveyor could be quite large and variable. For example, a 42 inch wide conveyor and packages of only several inches in width up to three feet in width (and similar heights) are not uncommon in package handling systems. Therefore, the one square inch label may be located anywhere across the width of the conveyor. Packages are also likely to be located at skewed angles with respect to the axis of movement of the conveyor belt. The parcels, packages, letters or the like will have different heights, so that the labels to be scanned may be located, for example, one inch or less above the conveyor, on the one hand, or up to 36 inches or more above the conveyor, on the other hand, with respect to the maximum height packages that the described system can accommodate.

In order to properly illuminate the labels in accordance with this invention, especially considering the wide range of package widths, heights and the angle of presentation of the labels, it is desirable to use a high-intensity light source, which will reflect well based on the two or more optical properties selected for the label. The light might be infrared, ultraviolet or visible light, and the light spectrum of usable visible light may vary. The technique for sensing the light preferably involves sensing light reflected from the black, white and gray hexagons of the label.

The illumination source must produce enough reflected light at the light sensor (for example a CCD device, as described below) to permit the light sensor to reliably distinguish among black, gray and white or whatever optical properties of the hexagons are being sensed. In a dynamic scanning system an array of LED's could be used to produce an illumination level of about 10 mW/cm$^2$ in the label illumination area at the level of the label. The LED's may be in an area array, without using a focusing lens, or a linear array, with a cylindrical focusing lens. A laser light source, passed through a suitable optical system to provide a line source of illumination could also be used in the practice of this invention.

The selection of the light source and the properties of the light source for the application in question are within the purview of the skilled artisan. It is to be recalled that, since the label to be located is only one square inch in maximum dimension, located at heights of up to 36 inches on a 42 inch wide belt travelling at speeds up to, for example, 100 linear inches per second, it is very important to be able to illuminate the labels properly in order to identify and locate the labels quite promptly.

In the case of the static fixed-focus sensor utilized in the illustrative example, an illumination level of about 2 milliwatts/cm$^2$ proved suitable for the practice of the invention. This was accomplished by means of a fluorescent light source.

2. Optical Sensing of the Reflected Label Image

The second step in the recognition portion of the decoding process is to optically sense the illuminated area with an electronically operated sensor. The camera/light sensor used in the illustrative example for a static fixed-focus scanning system comprised an industrial quality color CCD television camera, such as model number WV-CD 130, available from Panasonic Industrial Company, One Panasonic Way, Secaucus, N.J. 07094, fitted with a 50 mm f1.3 C-mount TV lens including a 5 mm extension tube, available from D.O. Industries, Inc. (Japan), 317 East Chestnut Street, East Rochester, N.Y. 14445 and identified under the brand name NAVITRON ™. The camera was coupled to an image capture board designated model number DT-2803-60, available from Data Translation Inc., 100 Locke Drive, Marlboro, Mass. 01752.

Optical sensing may involve imaging the entire label, utilizing an area sensor such as the above-described camera and image capture board or, in the alternative, may be accomplished with a linear array sensor incorporating a charge coupled device ("CCD") chip, wherein the second dimension of the label scanning is performed by the movement of the package (and label). A suitable CCD chip for this purpose is the Thomson-CSF THX 31510 CDZ, 4096 element high speed linear CCD image sensor, available from Thomson-CSF, Division Tubes Electroniques, 38 rue Vautheir B. P. 305 92102 Boulogne-Billancourt Cedex, France.

For dynamic systems involving the movement of label-bearing packages on a conveyor system, it is desirable to have a long optical path between the labels being sensed and the light sensor. The primary reason for creating a long optical path is to reduce the change in apparent size or magnification of the label as sensed by a remote light sensor. For example, if the optical path is, say, four feet, the image size for labels one inch above the conveyor will be very different from that for labels three feet above the conveyor. If a long optical path is used of, say, twenty feet, the images sizes of the same labels are almost the same. This allows the area being sensed, regardless of height, to fill all or substantially all of the area of the light sensor, to achieve consistently high image resolution. If an area sensor rather than a line sensor is used, the same principle would also apply. This may be accomplished by means of a long optical path as depicted in FIG. 6.

In order to be able to focus on labels of different height packages, a height sensor is needed. An ultrasonic sensor may be used or a set of light beams may be broken by the package as a sensor. Either of these systems is usable and may then activate a suitable adjustable focusing mechanism with an open or closed loop mechanism to sense and adjust the position of the optical sensing elements (e.g., lenses and sensor) in relation to each other on a continuous basis, as seen in FIG. 6.

FIG. 6 is a schematic view of a camera focusing and adjusting system operable in accordance with the invention for adjusting the position of the camera light sensor in accordance with the height of the package being sensed. FIG. 6 demonstrates a view of a suitable lens 196, coil drive, height sensor and feedback loop in accordance with the invention. In FIG. 6, the height sensor 206 may be an ultrasonic height sensor or a light beam which is broken by each package travelling on the conveyor, for example. The height sensor output is fed to microprocessor 204 which in turn actuates coil driver 202 to move coil 200 on which CCD 198 or other suitable light sensor is mounted. A shaft position sensor 208 senses the position of coil 200 and its output to microprocessor 204 completes a feedback loop for sensing and adjusting the position of coil 200.

The sensor must be able to sense the reflected light coming from the illuminated label, and must also produce an analog signal corresponding to the intensity of the reflective properties of the label as recorded by the individual pixels of the electro-optical sensor.

A suitable light source, as described above, may be mounted to a mounting surface above a conveyor to bathe an area extending across the entire width of the conveyor with a light of predetermined quality and intensity. The reflected light from the label may be folded by a series of reflectors and then is sensed by an electro-optical sensor.

The purpose of the folded optical path is to create a compact and therefore more rigid system.

The analog video signal output of the sensor is then filtered. The analog electrical signal is utilized in conjunction with an analog bandpass filter to detect the presence of an acquisition target on the data array. The analog signal is then converted to a digital signal using a conventional analog-to-digital converter incorporated in the image capture board described below or by other means known in the art. In place of an analog bandpass filter, it is possible to substitute digital filtering circuitry to determine the presence of the acquisition target by comparing the digital data representative thereof to the digitized signal output of the analog-to-digital converter, as more fully described below.

An example of an area sensor having a CCD chip with a plurality of detectors and which was used in accordance with the invention is the previously described Panasonic WV-CD 130 color CCD television camera. The analog signal output of the sensor was communicated to the previously described Data Translation DT 2803-60 image capture board, including a 6 bit monochrome video A/D conversion for digitization and later operations. By means of a suitable stored subroutine the sequenced digital output of the image capture board was saved in a memory device as an exact replica of the image recorded by the optical sensor.

3. Processing the Reflected Image

The most important part of the invention is to process the optically sensed image in order to be able to recreate and orient with accuracy the original label configuration and the color (optical properties) of each hexagon. This is done by using the following steps, after which the known pattern by which the label was originally encoded and bit-mapped may be used to decode the information contained in the label.

(a) Locating the Target Center.

Figure 10:
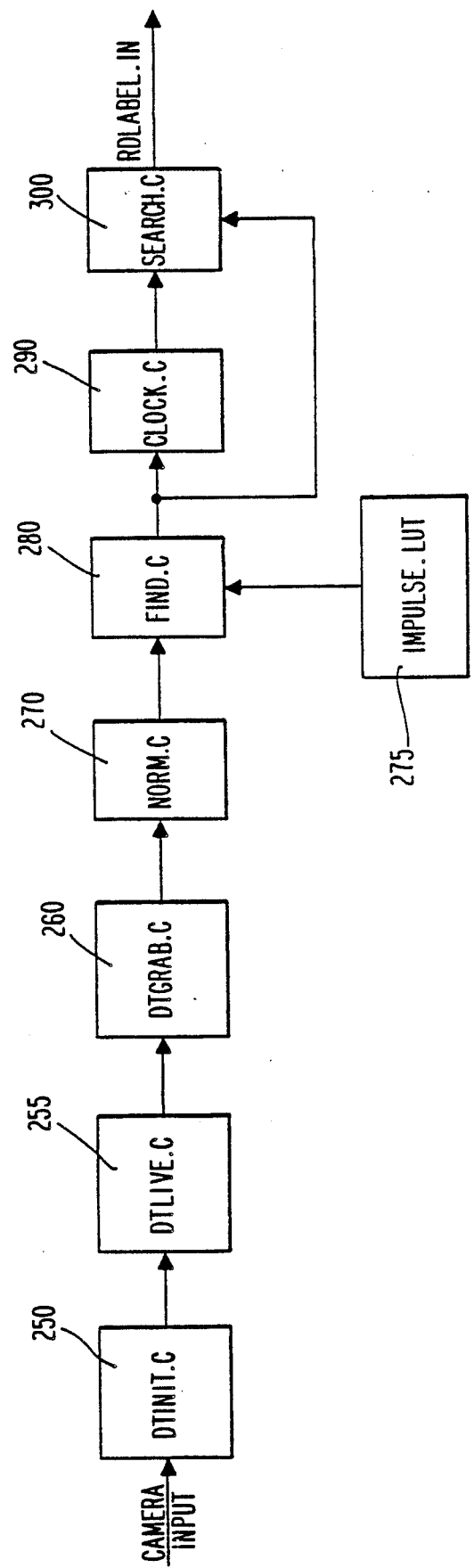
FIG. 10 is a flow chart showing the sequence of image processing steps.

Prior to utilizing the above-described CCD television camera and image capture board, as outlined in FIG. 10, an initialization program "DTINIT.C" 250 was run to put the image capture board into a known ready state and to load the output color look-up tables, followed by the program "DTLIVE.C" 255 to put the image capture board in "live mode." The program "DTGRAB.C" then causes the image capture board to digitize the scene into a 240 row by 256 column image memory, with samples stored as 6 bit values right justified in bytes. The foregoing programs may be found within the Microfiche Appendix respectively at page 31, lines 1 to 53; page 32, lines 1 to 39; page 33, lines 1 to 22; and page 34, lines 1 to 19. Two auxiliary programs "DTSAVE.C" and "DTLOAD.C" allow screen images to be transferred to and from a storage medium. Source code listings for the foregoing programs may be found within the Microfiche Appendix, respectively, at page 35, lines 12 to 33; and page 36, lines 13 to 33.

In first acquiring the label image, a conventional analog band pass filter can be used to identify two or more optical properties of the acquisition target Concentric Rings. These two optical properties are preferably the colors black and white because the greatest contrast will create the strongest signal energy. In order to find a fixed pattern of transition from black to white to black, etc., it is desirable that a linear scan across the acquisition target and passing through the center of the target yield a uniform frequency response regardless of label orientation. Thus, the target rings are optimally comprised of contrasting Concentric Rings. The sensor output was then bifurcated and taken through two detection paths. One path detects all of the energy in the output and the other measures the energy at the ring frequency. When the two outputs are compared, the energy in the ring detector most closely approximates the energy in the all energy detector when a scan through the acquisition target center is being sensed. The acquisition target center is located when this closest approximation occurs. Source code listings relating to the creation of a digital bandpass filter and filtering process may be found in the Microfiche Appendix under the File Name "FIND.C," pages 39 through 43. However, in the dynamic preferred embodiment of the invention, the first filtering step would preferably use an analog bandpass filter or else a sampled analog bandpass filter, although a digital filter is usable.

It is to be noted that the acquisition target locating step denoted "FIND.C" 280 in FIG. 10 is indicated as optional in FIG. 7, because a hand-held scanner can be used in the process of the invention, in which event the operator could properly place the scanner to assure correct aligment of the sensor. This is, of course, much slower than the use of an automated sensor and the use of the automated sensor is preferred in a high speed operation. If an automated sensor (not hand held) is used, locating the target is a required step of the process.

As an alternative to an analog filter described above, a digital bandpass filter may be constructed using the Parks-McClellan algorithm supplied with the software package "Digital Filter Designs Software for the IBM PC" (Taylor and Stouraitis, Marcel Dekker, Inc., New York, N.Y., 1987).

Figure 8:
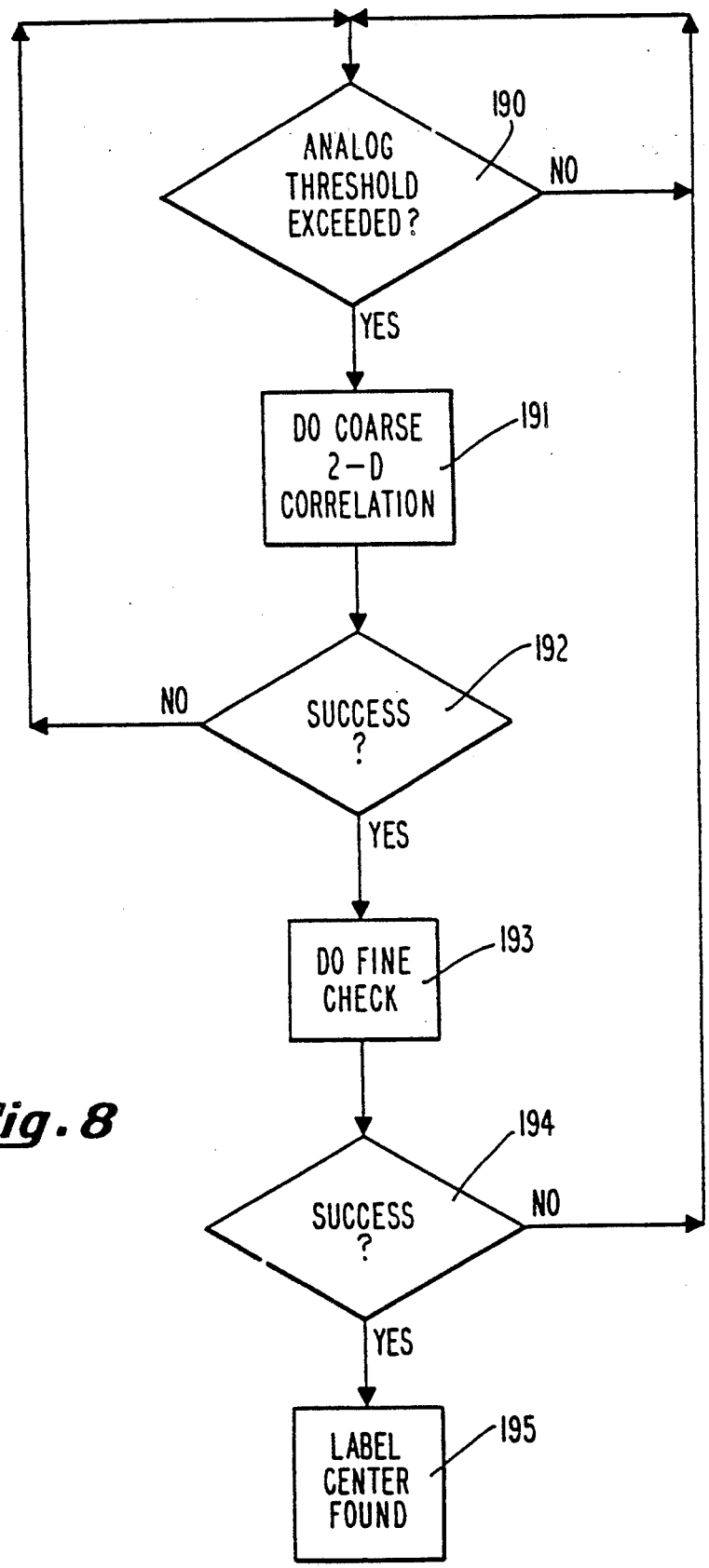
FIG. 8 is a flow chart showing the acquisition target location process.

A one-dimensional digital band pass filter has been utilized in connection with the present invention to filter a normalized digital bit stream, as described below, through the following filtration sub-routines. The band being filtered is the expected ring frequency. The one-dimensional digital, bandpass filter was designed for a sampling rate of 400 pixels per inch and a length of 125 pixels (or 0.3125 inches), and designed to be based upon the size of the printed acquisition target rings, as illustrated in FIG. 3. The frequency was 300/16 line pairs per inch, yielding a normalized frequency, (where 400 line pairs per inch =1) of 300/16×400 or 0.046875. A filter with a passband extending 5% below this frequency and 15% above was chosen because label distortions typically result in image shrinkage and therefore an increased frequency. Stop bands from 15% below the frequency down to 0 and from 25% above the ring frequency to 0.5 (Nyquist limit) were constructed. The filter coefficients were stored in the file "IMPULSE.-LUT" 275, per FIG. 10, for later operations, deleting the first 62 coefficients, because the filter is symmetrical. A flow chart is illustrated in FIG. 8. Further reference may be made to the source code listings in the Microfiche Appendix, under the file name "FIND.C", 280 starting at page 39.

A filter of 25 pixels in length was constructed by sampling the band pass filter at output intervals corresponding to the measured horizontal magnification. For example, if the horizontal magnification of the image is 80 pixels per inch, every fifth sample of the filter would be used (400/80=5 pixels). For non-integer steps, linear interpolation of adjacent filter samples is used.

A second 25 by 25 pixel two-dimensional filter was also utilized. Sample values for this two-dimensional filter were based on the Euclidean distance of each point from the center of the filter, which were scaled for appropriate horizontal and vertical magnifications. Linear interpolation is then used for non-integer sampling intervals.

The output of the above-mentioned one-dimensional filter was squared and smoothed with a first order recursive lowpass filter, providing an exponential window of past history. When the smoothing filter output exceeded a predetermined threshold, an optional two-dimensional filtering step was employed to verify the existence of the target and to accurately determine its location, as described below. The first part of the two-dimensional filtering used a reduced filter size of 10 pixels by 10 pixels to save computation. This filter scans a rectangular area around the location detected by the one dimensional filter. If the maximum two-dimensional correlation exceeds a predetermined threshold, then the final stage of two dimensional filtering, with the full 25 pixel by 25 pixel filter, was applied to a small square window around the maximum. If the best result of this filter exceeded a predetermined threshold, the center was detected. If any of the thresholds were not exceeded, the program partially "discharged" the smoothing filter and reverted to one dimensional scanning. If one dimensional scanning completed without detecting the presence of the acquisition target, the program exited with an error return. For any further elaboration of the filtering process employed in the illustrative example, reference should be made to the source code listings in the Microfiche Appendix, pages 39 through 42.

(b) Normalization of Sensed Image

Reflected light intensities recorded by the optical sensor employed may vary due to variations in illumination, print density, paper reflectivity, camera sensitivity and other reasons involving degradation to the label, for example, folding, warping, etc. As an optional (but desirable) step, the reflected light sensed by the sensor and communicated to the memory may be normalized by conventional procedures. Using techniques known in the art, a stored normalization program "NORM. C" 270, depicted on FIG. 10, was used to analyze the intensity levels of reflected light from the label, as recorded by blocks of pixels in the scanner, to find the minimum and maximum reflected light intensities recorded for the data array. The sequenced digital output of the above-described scanner and image capture board combination was loaded from memory to the computer to be further operated upon by said stored normalization program.

Utilizing an equation $y=mx+b$, where the minimum intensity substituted for x will yield a value of $y=0$ and a maximum intensity substituted for x will yield a value of $y=63$, the recorded intensities of reflected light for each pixel were adjusted so that the blackest black and the whitest white present in the stored image were established as the standard, and the other shades of black, white and gray were adjusted to those standards. The normalization step thus makes the sensed image easier to process. Normalization was carried out using the stored program "NORM. C" found in the Microfiche Appendix at page 37, lines 10 to 52 and page 38, lines 1 to 11. It will be appreciated that other, more sophisticated normalization procedures known in the art may be applied.

(c) Rescaling the Image

For subsequent computations, the stored replicated label image is rescaled to create an image with equal horizontal and vertical magnification. Again, this is an optional step, but it facilitates the fast and accurate recovery of the encoded information. The rescaling operation was performed to give the image a uniform horizontal and vertical sampling resolution of, for example, 150 pixels per inch, as used in the illustrative static fixed focus embodiment of the invention.

The rescaling operation occurs by computing the fractional row and column addresses of samples at 1/150 inch, based upon the known horizontal and vertical magnification. Each point on the new uniform rescaled image is then extracted from an appropriate set of points on the image replicated in the storage medium. Bilinear interpolation is used to approximate the value of points at fractional addresses. The rescaling places the center of the label at a known position in memory. The rescaled image is stored for later use in the searching step. All subsequent process steps then assume that a rescaled label image is centered on a known position on the grid, but it should be noted that this does not indicate the orientation of the label, which may still be skewed with respect to the sensor. The rescaling operation is carried out under the control of a stored subroutine found in the source code listings within the Microfiche Appendix at page 42, lines 14 to 52 and page 43, lines 1 to 14.

(d) Two-Dimensional Clock Recovery

The next sequence of steps of the process are referred to collectively as "two-dimensional clock recovery." The steps are performed by a suitable stored program and subroutines entitled "CLOCK. C" 290, depicted on FIG. 10, and found within the Microfiche Appendix at pages 44 through 51. This operation is performed in two dimensions on the rescaled image to determine precisely the position of each hexagon on the original data array. The purpose of clock recovery is to determine the sampling locations and to correct for the effects of warping, curling or tilting of the label, since the label may not be perfectly flat. This is an important part of the process and its application is not limited to hexagonal encoded labels. It may be applied to other processes for decoding an encoded label comprising a regular, two-dimensional grid, such as squares, triangles, etc.

One-dimensional clock recovery is a general concept which is well understood in the signal processing field. Two dimensional clock recovery is an extension of that process and will be understood, upon reflection, by the skilled technician. It will be understood that the "clock recovery" term is somewhat confusing to the nonexpert, since it does not relate to timing.

(i) Edge Enhancement and Non-Linear Operation

The first step in accomplishing clock recovery may be performed by various non-linear mapping operations known in the art to create signal components at a specified clock frequency that are missing from the digitized image output from the optical sensor and image capture board. The purpose of non-linear mapping is to take the (preferably) normalized and rescaled image which exists at this point in the process and to form it into a two-dimensional non-linear map which enhances the transitions between adjacent contrasting hexagons. In the preferred embodiment of the present invention, this is done by standard deviation mapping. This step can also be performed by filtering with an image differencing kernel, several means for which are known in the art, such as LaPlace or Sobel kernels, and then an absolute value is determined or squaring of the results is performed. These procedures may be found in the text Digital Image Processing, Rafael G. Gonzalez and Paul Wintz, Addison Wesley, 1977.

In standard deviation mapping, the image with undifferentiated cell-to-cell edges is stored in memory. A standard deviation map is then created to locate the edges of adjacent contrasting hexagons by determining the standard deviations of $3 \times 3$ groups of pixels (this is different from the 3 cell$\times$3 cell clusters), to determine the standard deviations of the pixel intensities. The standard deviation computations are performed to determine the regions of pixels having a fixed color (the lowest standard deviations), representing the interior of a hexagon or the interface between two like-colored hexagons, as opposed to the groups of pixels having higher standard deviations, which represent transitions from a hexagon of one color to an adjacent hexagon of a contrasting color. Because adjacent hexagons frequently have the same color, the standard deviation map will not completely outline every hexagon. Missing borders or edges between hexagons will result from the fact that the standard deviation mapping process cannot distinguish interfaces between hexagons of the same color. Further aspects of the clock recovery process are intended to regenerate these missing transitions.

The decoding process of the instant invention may be utilized for any of the previously described label embodiments, as illustrated in the accompanying figures. Encoding units of various geometries may easily be accommodated and such optically encoded polygonal cells may be arrayed with the geometric centers of adjacent polygonal cells lying at the vertices of a known, predetermined two-dimensional array.

When the optically readable labels of the instant invention are "read" with optical sensors of the types described herein, the particular geometry or shape of the individual encoding units or polygonal cells is not determined by the optical sensor. Instead, the sensor simply samples the optically readable label at a known number of samples per inch and records the intensity of the reflected light corresponding to the optical property of the particular sample area that has been imaged. These values are then stored in a storage medium for later processing. In other words, the electro-optical sensor records the average light intensity sample area-by-sample area across the entire label surface, regardless of whether or not anything is printed on the label. This is what is meant by storing the image with undifferentiated cell-to-cell edges in memory. For this reason the decoding process is readily adaptable to reading optically readable labels of widely varying configurations, so long as the centers of the polygonal encoding units lie at a predetermined spacing and direction on a two-dimensional array.

In practice it has been found that alterations of the hexagonal encoding cell-based system, as in the case of label embodiments employing polygons substantially in the shape of hexagons as illustrated in FIG. 15, result in negligible reduction of the system's performance. Utilizing polygonal shapes with poorer packing characteristics, or arrays of partially contiguous or noncontiguous polygons rather than contiguous packing, will then result in a poorer, but nevertheless, usable system performance for many applications. At some point, however, due to the optically unresolvable high frequency components of lower order polygonal encoding cells, inefficient cell packing and predetermined two-dimensional arrays resulting in large interstitial spaces between polygons, the system performance will fall to an unacceptably low information storage and retrieval capacity.

The acceptability of the system depends on the quality of the signal recovered by the electro-optical sensor. By altering the sensing system, as for example by increasing the number of samples per unit area across the label surface, one could improve the signal recorded by the sensor and improve the information storage and retrieval characteristics of such partially contiguous and noncontiguous label configurations. Such adjustments, in order to make such less desirable label configurations usable, would be within the abilities of one of ordinary skill in the art of electro-optics.

The process, therefore, allows a wide variability in terms of the label article, optical signal acquisition means and signal processing. Polygonal cells, of either regular or irregular form may be used as encoding units on the optically readable labels of the invention. Further, so long as the spacing and direction of the centers of the polygons are known in relation to adjacent polygonal cells, the polygonal encoding cells may lie on a predetermined array, other than a hexagonal array, and the polygons may be arranged contiguously, partially contiguously or even noncontiguously on the optically readable label.

As explained in greater detail below, the nonlinear mapping techniques, specifically the standard deviation mapping techniques disclosed herein in relation to the preferred embodiment, facilitate reconstruction of the missing transitions or edges between polygonal cells of like optical properties. Moreover, the same feature may overcome the lack of transitions between polygons and interstitial spaces between polygons of like optical properties. This is the situation when label configurations containing partially contiguous or noncontiguous polygons are utilized. This feature is accomplished through the following Fast Fourier Transformation, filtering and inverse Fast Fourier Transformation steps.

An optional technique utilized in the preferred embodiment of the present invention reduces the computations needed to generate the standard deviation map. Normally, to compute the sum of the nine pixels in each 3×3 pixel block, eight addition operations would be needed. This may be cut in half by replacing each pixel of the image with the sum of itself and the pixels immediately to its left and right. This requires two additions per pixel. Then, the same operation is performed on the new image, except the sum is computed for pixels immediately above and below. This requires two more additions for a total of four. It can be shown that, at the end of these steps, each pixel has been replaced by the sum of itself and its eight immediate neighbors.

Standard deviation mapping is the desired technique for creating this map of hexagons corresponding to the original data array but with missing transitions between original hexagons of the same color. The specific standard deviation mapping techniques utilized in conjunction with the illustrative embodiment may be found within the source code listings in the Microfiche Appendix at page 45, lines 14 to 53 and page 46, lines 1 to 4.

(ii) Windowing

The next subroutine, called windowing, is optional. Windowing was used in the practice of the invention to reduce the intensity of borders which are not associated with hexagon outlines. These borders occur at two locations: the target rings and the uncontrolled image surrounding the label. A weighting function is utilized to reduce the intensity of these areas. The details of how to use windowing as a precursor to a Fast Fourier Transform is within the purview of the skilled artisan. The windowing procedure utilized may be found within the source code listings contained in the Microfiche Appendix at page 46, lines 6 to 22.

(iii) Two-Dimensional Fast Fourier Transformation

A two-dimensional Fast Fourier Transformation of the digital values corresponding to the (optionally) windowed standard deviation map is then performed under the control of a commercially-available stored program. In operation, a computer performs a Fast Fourier Transform of the image generated by the prior step to yield a two-dimensional representation of the spacing, direction and intensity of the interfaces of contrasting hexagons identified in the standard deviation mapping step. Simply stated, the Fast Fourier Transform is a measure of the spacing, direction and intensity of the edges between hexagons, where known. Thus, the regular spacing and directionality of the hexagon boundaries will cause certain points in the transform domain to have a high energy level. The brightest points will be at 0,0 in the Transform plane corresponding to the DC component in the image. The six points surrounding the central point represent the spacing, direction and intensity of the edges between hexagons.

It will be recognized by one skilled in the art that, as for hexagons, a two-dimensional representation of the spacing, direction and intensity of the interfaces of contrasting polygons identified in the preceding standard deviation mapping step can also be computed by performing a Fast Fourier Transform of the digital data corresponding to the non-linearly mapped sensed label image. Thus, the spacing and directionality of the polygon borders will cause certain points in the transform domain to have high energy. The number of points of higher energy surrounding the center point at the 0,0 coordinate of the transform plane will depend on the geometry of the particular polygonal encoding cell used to make the optically readable label. As for hexagons, however, such points surrounding the central point will represent the spacing, direction and intensity of the edges between polygons or the edges between polygons and interstitial spaces if the label configuration is either partially contiguous or noncontigous in nature.

Since the image is real (not complex) valued, the Transform domain is point symmetric about the origin. Thus, only a half plane of the transform domain must be computed, thereby saving nearly a factor of two in computation time. Elimination of these computations also reduces the amount of effort required in the subsequent image filtering and Inverse Fast Fourier Transformation steps. The Fast Fourier Transform program utilized in connection with the illustrative embodiment of a static fixed focus system was the commercially-available subroutine R2DFFT from the 87 FFT-2 package from Microway, Inc. of Kingston, Mass.

(iv) Filtering the Image

A filtering process is now required to reconstruct the complete outline of all of the hexagons in the image domain, utilizing the transformed digital data. This is done by eliminating any transform domain points that do not correspond to the desired spacing and direction of hexagon boundaries identified in the standard deviation mapping step. Six prominent points in the transform domain arise because of the hexagonal honeycomb structure of the label. Only three points in the transform domain are actually identified, because the image is point symmetric about the origin, and the second three points may be inferred from the first three. In the preferred embodiment, filtering is performed in three steps to eliminate transitions from the standard deviation mapping step, which are too far apart, too close together, and/or in the wrong direction.

First, high pass filtering is performed by zeroing all points within a predetermined circle around the origin of the Transform domain, but at a distance extending outward from the origin, short of the six prominent points arrayed in the shape of a hexagon, in the graphic transform domain. These points correspond to spacings greater than the hexagon spacings and thus carry information pertaining to the missing transitions in the label image. To recreate missing transitions in the label image, it is necessary to eliminate the information about the missing transitions in the Fourier Transform domain.

Next, all points outside a certain radius beyond the six prominent points in the Transform domain are zeroed. These correspond to spurious transitions that are spaced too close together. This operation combines with the first one to form a ring of remaining points. Creating this ring is equivalent to performing spatial bandpass filtering. The inner and outer radii of the annulus are determined by the expected spacing of the hexagon outlines. Since the hexagon "diameter" is expected to be 5 pixels in the example being described, and for a transform length of 256 pixels, the hexagonal vertices in the Transform domain should be 256/5 = 51.2 pixels away from the center. Accordingly, a ring with an inner radius of 45 pixels and an outer radius of 80 pixels corresponds to hexagon diameters of 3.2 to 5.69 pixels was used. A filter with a preference for passing higher frequencies was used because label deformations, such as warping and tilting, cause image shrinkage.

After performing the spatial bandpass filtering described above, an annulus with six prominent points exists, each point having equal angular spacing with respect to the center (0,0 point) of the transform domain. To complete the task of rejecting undesired information in the Transform domain, a directional filtering step is employed. Any point at too great an angular distance from the prominent regions in the Transform domain is zeroed. This has the effect, in the image domain, of removing any edges that do not occur in one of the three directions dictated by the hexagonal honeycomb tiling pattern.

To perform directional filtering it is necessary to find the most prominent point remaining after spatial bandpass filtering. This point is assumed to be one of the six prominent points of the transform domain resembling the vertices of a hexagon. Five other prominent points at the same radius from the center and with angular spacing of multiples of 60 degrees are also evident in the transform domain. Therefore, all other points with an angular distance of greater than 10 degrees from any of these points are eliminated. Six wedges of the ring remain. By this directional filtering step, any information of incorrect spacing or direction in the image domain is eliminated. Elimination of this incorrectly spaced information enables the restoration of a complete outline of each hexagon in the image domain.

The foregoing filtering steps are performed under the control of stored subroutines contained in the source code listings within the Microfiche Appendix at page 46, lines 26 to 53; page 47, lines 1 to 52; page 48, lines 1 to 52; and page 49, lines 1 to 46.

The foregoing discussion of the filtration scheme employed for the preferred label embodiment comprising contiguously-arranged hexagons requires modification when different predetermined two-dimensional arrays are utilized for the optically readable label. It will, nevertheless, be appreciated by one skilled in the art that only slight modifications to the filtration scheme are required to accommodate the different label configurations that have been previously described herein, and which are illustrated in the accompanying drawings.

Once the individual polygonal encoding cells are decided upon, it is predetermined that their respective boundaries will have certain angular spacings, and a given number of sides of given length. Next, it is necessary to determine the relationship of adjacent polygons, as for instance, whether they will be contiguous, partially contiguous or noncontiguous. Also, the geometric array upon which the geometric centers of the polygons will be arranged needs to be established. Since the foregoing label geometry is predetermined a person of ordinary skill in the art can construct the appropriate filtration scheme to filter the energy points in the transform domain, so that only the brightest points corresponding to the appropriate spacing and direction of polygons boundaries is operated upon by the inverse Fast Fourier Transform subroutine.

Concerning the actual filters constructed, it will be appreciated that it is necessary to construct an appropriately dimensioned spatial bandpass filter based upon the predetermined spacing of the polygonal encoding cells. Then, it is desirable to construct a directional filter to filter out energy points other than the most prominent points corresponding to the axes of the predetermined two-dimensional array of the polygonal encoding cells. This eliminates any information concerning the incorrect spacing or direction of the polygonal encoding cells in the image domain and the interstitial spaces if present. By eliminating such incorrect information a complete array of the centers of the polygonal encoding cells can be reconstructed in the image domain by means of inverse Fast Fourier Transformation in accordance with the process step described below.

(v) Inverse Fast Fourier Transformation

To actually return to the image domain, thereby restoring the outline image of the contiguous hexagons of the data array, it is desirable to perform a two-dimesional Inverse Fast Fourier Transform (2D-IFFT) on the filtered transform domain data. The inverse transform is implemented by a standard two-dimensional Inverse Fourier Transform subroutine (R2DIFT) available in the 87FFT-2 package from Microway, Inc. of Kingston, Massachusetts. Upon completion of the inverse Transform step, the outline of every hexagon is restored in the image domain. In the new image, the centers of the hexagons have high magnitude. The actual magnitude of the spots at the hexagon centers is dependent on how many edges were in its neighborhood. More edges create greater energy at allowed frequencies and hence high magnitude spots. Fewer edges give rise to lower magnitude spots. The magnitude of the spots is a good measure of the confidence level in the clock restoration at any given point.

(e) Major Axis Determination

The hexagonal image has now been recreated but its orientation needs to be determined.

The hexagonal honeycomb pattern of the invention has three "axes" spaced 60 degrees apart. The direction of these axes is established by the brightest points in the transform domain after spatial bandpass filtering. It is now possible to ascertain which of these three axes is the major axis. This step is optional. If this step is not performed, the label would have to be decoded three times, using each of the three axes, with only one axis yielding a meaningful message. The major axis is arbitrarily chosen as the axis which runs parallel to two sides of the label as described hereinabove and depicted in FIG. 2.

If the boundaries of the square label are determined based on the knowledge of the major axis, then most of the energy in the restored hexagonal outline pattern will be inside this square's boundaries.

To determine the major axis, each of the three axes is assumed to be the major axis. The consequent square label outline is determined for each trial axis, and the total clock restoration pattern energy interior to that square is determined from the digital energy data output from the inverse transform subroutine. The correct trial is the one with the most energy. The angle of this major axis is then stored for the initialization step and other searching operations. At this juncture, it is not yet known whether the recorded angle is in the correct direction or 180 degrees away from the correct direction. The source code listings in the appended Microfiche Appendix pertaining to the determination of the major axis may be found at page 49, lines 48 to 54; page 50, lines 1 to 53; and page 51, lines 1 to 5. It will be appreciated that all three label areas do not need to be determined in toto, since the energy in the areas common to all three squares does not need to be determined.

(f) Searching

A stored program entitled "SEARCH.C" 300, depicted on FIG. 10, combines the Transformed and regenerated hexagon center information with the stored intensity levels of the original image so as to determine the gray level value of each hexagon. The search is performed in such a way as to minimize the chances of "getting lost" while searching. The end result is to obtain a matrix of the gray level value for each hexagon of the data array. The source code listings for "SEARCH.C" may be found within the Microfiche Appendix at page 52 through 60. Four important information arrays are constructed during the first part of the SEARCH.C program. The array CVAL (clock value) stores a measure of the quality of the recovered clock signal for each hexagon, while the array GVAL stores the grey level value (0-63) at the center of each hexagon. The remaining arrays IVAL and JVAL store the row and column locations of the center or each hexagon.

(i) Initialization Steps

From the major axis angle determined in step (e) and the known spacing of the hexagons (5 pixels) in the example, the expected horizontal and vertical displacements from the center of one hexagon to the centers of the surrounding six hexagons are computed.

Following these computations, the SEARCH.C program operates on the clock recovery signal, retrieved from memory and the rescaled label image, also retrieved from memory. The fundamental purpose of the initialization subroutine found in the Microfiche Appendix at page 52, lines 13 to 54; page 53, lines 1 to 48; page 56, lines 47 to 57; and page 57 lines 1 to 35 is to merge and condense the information from these two sources and to generate a data matrix providing the grey scale value for each hexagon.

The initialization step of the search is bounded by a square around the label's center of about ⅛ of an inch on a side. Within this area, a good starting point is the point of highest magnitude in the recovered clock signal array is found. Then, the location of this starting point relative to the center of the label is determined. This starting point is a point where the clock signal is strong and distinct, and also a point relatively near the center of the label. A strong, distinct signal is desired to ensure that searching begins with a valid hexagon center, and it is desired that the point be near the center of the label so that its absolute location can be determined without serious influence from warping or tilting. The measure of the quality of a point in the clock recovery pattern is the point's magnitude minus the magnitude of its eight surrounding points. The rectangular coordinates of the starting point are converted to polar form, the polar coordinates are adjusted relative to the previously determined major axis angle, and this result is converted back to rectangular form. These coordinates are scaled according to the expected row spacing (4.5 pixels) and column spacing (5 pixels) to arrive at the insertion position on the hexagon matrix. The clock quality, grey levels and locations corresponding to the starting hexagon are then inserted in the respective arrays CVAL, GVAL, IVAL and JVAL.

(ii) Main Search Loop

The main search loop proceeds to locate the centers of the remaining hexagons. The loop terminates when the expected number of hexagons has been located. The order of the search for hexagon centers is extremely important. The increased reliability of the decoding process in the face of label degradations comes from the particular search technique employed, as described below.

Each iteration of the search loop begins by recalling the location of the highest magnitude clock recovery spot whose neighbors have not been searched for their strongest values. From this known point, the search will be extended one hexagon in each of six directions. The effect is to build up the search pattern along a path from better to worse recovered clock quality. Thus, if there is a weak area of recovered clock, e.g. at the label center or an obliterated area, the search algorithm skirts around it rather than going through it. By outflanking these weak areas and saving them for last, the probability of getting lost on the grid is greatly reduced. Since getting lost is just as bad as reading a gray level incorrectly, this characteristic of the search algorithm is extremely powerful.

A subroutine found in the Microfiche Appendix at page 53, lines 50 to 54; page 54, lines 1 to 53; and page 55, lines 1 to 55, is responsible for searching the neighbors of the best quality clock value found in the main loop. The subroutine loops six times, once for each hexagonal neighbor of the hexagon then under consideration. First, the position of a neighbor is computed. If this neighbor is outside the label boundary, the loop iteration terminates. If not, the neighbor is checked to see if it has already been searched from another direction. The loop iteration will terminate if the neighbor has been searched, since the algorithm makes earlier searches more reliable than later ones. If the neighbor gets beyond this test, the expected position of the neighbor's center in the clock recovery pattern is computed. At this point, a gradient search for the highest magnitude clock signal is performed. The eight pixels surrounding the recovered position are searched to see if a higher clock value is found. If it is, then the best neighboring point has its eight neighbors checked to see if an even better value is found. This gradient search provides a degree of adaptation which is imperative if warped and tilted labels are to be read. The subroutine then goes on to the next neighbor or returns when all neighbors have been checked.

As mentioned above under step (d), as a result of the data transformation processes, the reconstructed grid now carries information regarding the geometric centers of the polygonal encoding cells. This grid has more energy in areas where more contrasting interfaces originally existed. The centers will lie on the predetermined two-dimensional array having a predetermined number of equally- or unequally-spaced axes, as the case may be. The information concerning the spatial relationship of the axes of the predetermined two-dimensional array may desirably be used in the major axis orientation step.

It will be appreciated, however, that the algorithm could be appropriately modified to have the decoding process determine the actual geometry of the two-dimensional array and from that determination proceed to determine the filtration scheme, the so-called major axis of the label (i.e. the axis of the two-dimensional array that is parallel to two sides of a square optically readable label as discussed herein) and provide the necessary coordinates for the searching subroutine.

Whether the geometry of the label is determined by such an optional step as described above or simply entered into the decoding process through appropriate modifications to the two-dimensional clock recovery process, the variety of label configurations disclosed and discussed herein can be easily accommodated by one of ordinary skill in the art. It will be appreciated that the number of axes upon which the centers of the individual, adjacent polygonal encoding cells are arrayed and their respective angular orientation, can be substituted in the major axis determination step for the three axes of the hexagonal array of the preferred embodiment. Therefore the major axis of the predetermined two-dimensional array can be determined without performing the trial and error analysis described above in step (e).

As for the hexagonal array of the preferred embodiment, the information from the major axis determination step and the known spacing of polygons may be used to compute the expected horizontal and vertical displacements from the center of one polygon to the centers of surrounding polygons. Following these computations and after making the necessary adjustments to the search subroutine, the search, including the initialization step and main search loop step can proceed for the particular label configuration that is being employed. It will be appreciated that such minor adjustments to the search routine SEARCH.C 300 in the appended source code listings are within the abilities of a person of ordinary skill in the art.

After the subroutine completes, the current center location is marked so that it is not searched again. The effect is to delete this position as a candidate for having its neighbors searched. For each loop iteration, from 0 to 6 new candidates are added and one candidate is deleted. An efficient implementation could use a data structure which keeps candidates in magnitude order as insert and delete operations are performed. One such structure is called a priority queue (Reference: *The Design and Analysis of Computer Algorithms*, Aho, Hopcroft and Ullman, (Addison Wesley, 1974)). It is known that a linear search algorithm requires order $n^2$ operations whereas an efficiently implemented priority queue using a balanced tree or heap structure requires order $n \log n$ operations. An order n search algorithm based on bucket sorting could also be used, if recovered clock values are scaled and reduced to a small range of integers.

(g) Histogram Generation and Thresholding

After the main search loop terminates, the locations of the centers of all hexagons have been determined and the gray values of the centers of all hexagons, which have been stored, are completely filled in. The next step is to threshold the digitized grey level values in the range 0–63 to the discrete levels of, for example, black, grey, and white (for a black, white and grey label). This is done by building a histogram of the label image intensity values from the hexagon centers. Slicing levels can be determined by looking for dips in the histogram. The specific subroutine utilized to construct the histogram and determine the slicing levels may be found in the appended source code listings in the Microfiche Appendix at page 55, lines 16 to 52 and page 56, lines 1 to 15.

(h) Coarse Grid Correction and Final Orientation

After thresholding to discrete levels, two distortions may still be present. First, the array may be off center. This can happen if the initial search step does not correctly determine the location of the best quality clock signal relative to the label center. The second possibility is that the entire label has effectively been read upside down since the major axis angle has an ambiguity of 180 degrees.

A stored subroutine found at page 58, lines 1 to 54 and page 59, lines 1 to 24 within the Microfiche Appendix performs the function of determining whether the label is off center. If the label has been positioned correctly, the coordinates of the center row should pass through the center of the label. To determine if a vertical positioning error has been made, rows above the hypothesized center row are checked to see which would form a line passing closest to the label center. If a row above or below is closer than the hypothesized center row, then the appropriate shift up or down is made. If the left justification of short rows has been performed incorrectly, this is adjusted by shifting short rows one position to the right.

Horizontal positioning errors and upside down reading are checked using information embedded in the label known as coarse grid information. The information is distributed in 3 cell×3 cell clusters of hexagons as described hereinabove. Since the label may be, for example, on a 33 row by 30 column grid, these clusters form a 11 by 10 grid. The bottom center hexagon of each complete 3 cell×3 cell cluster has a special property which is provided during encoding. There is a guaranteed transition on either side of this hexagon, as previously described in connection with FIG. 4. For example, if the bottom center hexagon is black, the bottom left and bottom right hexagons must be either gray or white. A stored subroutine found at page 59, lines 27 to 52 and page 60, lines 1 to 33 of the Microfiche Appendix takes advantage of this transition property to remove the final two possible distortions. First an array is created where each element of the array indicates whether a transition took place between two horizontally adjacent hexagons. Then the array is checked for each of 9 hypothetical slides of the coarse grid arranged as a 3×3 pattern around the expected slide of 0. One of these slides will show a better match between actual and expected transitions, and this slide position is retained. Next, the same hypothesis is checked under the assumption that the label was read upside down. This will happen if the major axis angle actually pointed right to left in relation to how the label was printed rather than left to right.

If the label was simply inverted, i.e., interchanged higher rows with lower rows and higher columns with lower columns, then the results of slidings should be inverted as well. However, one important transformation must be performed to correctly invert the label. During reading the short (length 29) rows are left justified; thus, when the label is inverted these labels must be right justified. The adjustment is made, and it is this procedure which will make the results of the slide hypotheses other than a simple inversion. In fact, the best result from the slide tests will be better than any previous test if the label was actually read upside down.

Having determined whether or not the label was read upside down, and whether there was any slide in the absolute positioning, the label matrix can now be decoded. With correct determination of the image and slide, the image processing functions are complete and the data decoding processes are started.

4. Decoding

A stored program "RD.LABEL.C" 182 on FIG. 9 found within within the Microfiche Appendix at page 61, lines 1 to 52, and page 62, lines 1 to 28 reads the file generated by the search program and generates a bit stream file with, in the preferred embodiment, 1292 bits. It uses a stored subroutine Cell Dec.C 183 on FIG. 9 and contained in the Microfiche Appendix at pages 63 through 66 to mask out unusable hexagons, and to apply decoding which is the inverse of the coding program.

The first step in the decoding process is to generate a bit stream from the hexagon information, using a hexagon-to-bit mapping process which is the reverse of the bit-to-hexagon mapping process used in the encoding operation.

The bit (information) stream is then bifurcated by the program into a high priority message bit stream and a low priority message bit stream or as many bit streams as are used in encoding the label.

It is then necessary to apply error correction to each bit stream using the error coding techniques which were used in the label encoding process. For example, if Reed-Solomon coding is used, error correction on the bit stream generated by the search program generates an output which is in the same format as previously described for the encoding input file. Error correction may be performed in the following sequence (Reference: *Theory and Practice of Error Control Codes*, described above.)

1. Compute syndromes
2. Compute Error Locator Polynomial using Berlekamp-Massey Algorithm
3. Compute error locations using Chien search
4. Compute error magnitudes using Forney's Algorithm The last step is executed only if a correctable number of errors has been detected from steps 2 and 3. The number of errors detected are also computed. If an uncorrectable number of errors is detected or an error is located in the implied padding (described above), a flag is set. The specific error coding procedure utilized in the illustrative example may be found in the Microfiche Appendix at page 67 through 75, and is designated as ERRDEC.C 184 on FIG. 9.

5. Output

By tracking the package (by identifying its location on the conveyor) the high priority message, indicating the zip code of the package destination, can be used to activate suitable routing arms or conveyors to route the package to the proper truck, airplane or package carrier to take the package to its destination.

Although the invention may be as used in a conveyor/diverter system, it will be apparent that it can be used in a wide variety of information gathering, package handling and production operations in which it is desired to read a label on a package, letter, part, machine or the like and cause a system to perform a package handling or manufacturing operation, for example, on the object bearing the label. The invention allows these operations to occur with high speed, high accuracy, dealing with a substantial amount of label information and even protecting much of that information from being lost due to label tears and the like.

With reference to FIG. 9, to alternatively display the decoded message on a computer terminal, the program TEXTOUT.C 185 may be employed. Program TEXTOUT.C may be found within the Microfiche Appendix at pages 76 through 78.

What is claimed is:

1. An optically readable label for storing encoded information comprising a multiplicity of information-encoded polygons having at least five sides, said polygons arranged with the geometric centers of adjacent polygons lying at the vertices of a predetermined two-dimensional array, said polygons having one of at least two different optical properties.

2. An article as recited in claim 1, wherein said polygons are substantially in the shape of regular hexagons.

3. An article as recited in claim 1, wherein said optical properties are the colors black, white and gray.

4. An article as recited in claim 1, wherein said polygons are irregular polygons.

5. An article as recited in claims 1, further comprising a plurality of Concentric Rings occupying an area on said article separate from the area occupied by said information-encoded polygons, each Concentric Ring having one of at least two different optical properties in alternating sequence.

6. An article as recited in claim 5, wherein said Concentric Rings are centrally located on said article.

7. An optically readable label for storing encoded information comprising a multiplicity of information-encoded triangles, said triangles arranged with the geometric centers of adjacent triangles lying at the vertices of a predetermined two-dimensional array, and said triangles having one of at least two different optical properties.

8. An optically readable label for storing encoded information comprising a multiplicity of information-encoded polygons, said polygons noncontiguously arranged with the geometric centers of adjacent polygons lying at the vertices of a predetermined two-dimensional array, and said polygons having one of at least two different optical properties.

9. An article as recited in claims 8, wherein said polygons are regular polygons.

10. An article as recited in claims 8, wherein said polygons are irregular polygons.

11. An article as recited in claims 8, further comprising a plurality of Concentric Rings occupying an area on said article separate from the area occupied by said information-encoded polygons, each Concentric Ring having one of at least two different optical properties in alternating sequence.

12. An article as recited in claim 11, wherein said Concentric Rings are centrally located on said article.

13. A combination optical mark sensing and decoding system, comprising:
 (a) an optically readable label for storing encoded information comprising a multiplicity of information-encoded polygons having at least five sides, said polygons arranged with the geometric centers of adjacent polygons lying at the vertices of a predetermined two-dimensional array, and said polygons having one of at least two different optical properties;
 (b) means for illuminating a predetermined area;
 (c) means for optically imaging said predetermined illuminated area through which said label is arranged to pass and generating analog electrical signals corresponding to the intensities of light reflected from said polygons and striking each pixel of said imaging means;
 (d) means for converting said analog electrical signals into a sequenced digital bit stream corresponding to the intensities of light recorded by said pixels of said imaging means;
 (e) means for storing said digital bit stream for subsequent decoding of said label; and
 (f) means for decoding said digital bit stream, said decoding means producing an electrical output representative of the encoded information.

14. An apparatus as recited in claim 13, wherein said optically readable label further comprises a plurality of Concentric Rings, said Concentric Rings having alternating optical properties corresponding to at least two of the optical properties of said polygons.

15. A combination optical mark sensing and decoding system, comprising:
 (a) an optically readable label for storing encoded information comprising a multiplicity of information-encoded triangles, said triangles arranged with the geometric centers of adjacent triangles lying at the vertices of a predetermined two-dimensional array, and said triangles having one of at least two different optical properties;
 (b) means for illuminating a predetermined area;
 (c) means for optically imaging said predetermined illuminated area through which said label is arranged to pass and generating analog electrical signals corresponding to the intensities of light reflected from said triangles and striking each pixel of said imaging means;
 (d) means for converting said analog electrical signals into a sequenced digital bit stream corresponding to the intensities of light recorded by said pixels of said imaging means;
 (e) means for storing said digital bit stream for subsequent decoding of said label; and
 (f) means for decoding said digital bit stream, said decoding means producing an electrical output representative of the encoded information.

16. A combination optical mark sensing and decoding system, comprising:
 (a) an optically readable label for storing encoded information comprising a multiplicity of information-encoded polygons, said polygons noncontiguously-arranged with the geometric centers of adjacent polygons lying at the vertices of a predetermined two-dimensional array, said polygons having one of at least two different optical properties;
 (b) means for illuminating a predetermined area;
 (c) means for optically imaging said predetermined illuminated area through which said label is arranged to pass and generating analog electrical signals corresponding to the intensities of light reflected from said polygons and striking each pixel of said imaging means;
 (d) means for converting said analog electrical signals into a sequenced digital bit stream corresponding to the intensities of light recorded by said pixels of said imaging means;
 (e) means for storing said digital bit stream for subsequent decoding of said label; and
 (f) means for decoding said digital bit stream, said decoding means producing an electrical output representative of the encoded information.

17. An apparatus as recited in claim 16, wherein said optically readable label further comprises a plurality of Concentric Rings, said Concentric Rings having alternating optical properties corresponding to at least two of the optical properties of said polygons.

18. A process of storing and retrieving data, comprising the steps of:
 (a) printing on a label a multiplicity of noncontiguously-arranged polygons encoded in accordance with an encoding process, said polygons defining a multiplicity of interstitial spaces among said polygons, said polygons arranged with the geometric centers of adjacent polygons lying at the vertices of a predetermined two-dimensional array, and said polygons and said interstitial spaces having one of at least two different optical properties;
 (b) illuminating said label;
 (c) optically sensing light reflected from said polygons with an electro-optical sensor;
 (d) generating analog electrical signals corresponding to the intensities of light reflected from said optical properties as sensed by individual pixels of said sensor;
 (e) converting said analog electrical signals into sequenced digital signals;
 (f) storing said digital signals in a storage medium connected to a computer to form a replica of said digital signals in said storage medium;
 (g) decoding said replica of said digital signals to retrieve the characteristics of the intensities, locations and orientations of the individual optical properties of said polygons; and
 (h) generating a digital bit stream output from the computer representing the decoded information represented by the polygons.

19. A process as recited in claim 18, wherein said label further comprises a plurality of centrally-located Concentric Rings, said Concentric Rings having alternating optical properties corresponding to at least two of the optical properties of said polygons.

* * * * *